US011667073B2

(12) United States Patent
Periyasamy et al.

(10) Patent No.: US 11,667,073 B2
(45) Date of Patent: Jun. 6, 2023

(54) METHOD FOR FORMING LAYERED THERMOSET SILICONE AND THERMOPLASTIC ARTICLES USING ADDITIVE MANUFACTURING, ARTICLES FORMED THEREFROM AND APPARATUS FOR USE THEREIN

(71) Applicant: Greene, Tweed Technologies, Inc., Wilmington, DE (US)

(72) Inventors: Mookkan Periyasamy, Wilmington, DE (US); Ronald R. Campbell, Harleysville, PA (US); Elizabeth Sassano, West Chester, PA (US); Wojciech Jan Hajduczek, Lansdale, PA (US); Michael A. Hickner, State College, PA (US); Lachlan Peeke, East Stroudsburg, PA (US)

(73) Assignee: Greene, Tweed Technologies, Inc., Wilmington, DE (US)

( * ) Notice: Subject to any disclaimer, the term of this patent is extended or adjusted under 35 U.S.C. 154(b) by 0 days.

(21) Appl. No.: 17/219,117

(22) Filed: Mar. 31, 2021

(65) Prior Publication Data
US 2021/0299949 A1 Sep. 30, 2021

Related U.S. Application Data

(60) Provisional application No. 63/003,146, filed on Mar. 31, 2020.

(51) Int. Cl.
*B29C 64/124* (2017.01)
*B33Y 70/10* (2020.01)
(Continued)

(52) U.S. Cl.
CPC .......... *B29C 64/124* (2017.08); *B29C 64/209* (2017.08); *B29C 64/227* (2017.08);
(Continued)

(58) Field of Classification Search
None
See application file for complete search history.

(56) References Cited

U.S. PATENT DOCUMENTS 9,108,360 B2    8/2015  Comb et al.
2016/0031155 A1 2/2016  Tyler et al.
(Continued)

FOREIGN PATENT DOCUMENTS

WO   WO-2017044735 A1 *  3/2017  .......... B29C 64/106
WO   WO 2020056057       3/2020

OTHER PUBLICATIONS

K. Elkins et al., "Soft Elastomers for Fused Deposition Modeling," Virginia Polytechnic Institute and State University, presented in the International Solid Freeform Fabrication Symposium, 1997, pp. 441-448.
(Continued)

*Primary Examiner* — Yung-Sheng M Tsui
(74) *Attorney, Agent, or Firm* — Calderone Bullock LLC

(57) ABSTRACT

A method is described for forming composite articles comprising thermoset silicon-containing polymers, that includes (a) providing a first composition comprising a first thermoset silicon-containing polymer; (b) providing a thermoplastic composition; (c) printing a first at least partial layer of the first composition comprising the first thermoset silicon-containing polymer using an additive manufacturing device; and (d) printing an at least partial reinforcing layer comprising the thermoplastic composition using an additive manufacturing device. Also described in an apparatus for preparing a composite article comprising thermoset silicon-containing polymers that includes an additive manufacturing printer having a printer drive mechanism, a first printing nozzle for forming a first layer of a first composition; and a second printing nozzle for forming a second layer of a second composition, wherein the additive manufacturing
(Continued)

printer is capable of providing two or more layers of each of the first and the second composition to form a three-dimensional composite article of the first and the second composition according to a computer design model, and wherein at least one of the first printing nozzle and the second printing nozzle is a pressurized printing nozzle comprising a heating mechanism in operable contact therewith.

35 Claims, 28 Drawing Sheets
(8 of 28 Drawing Sheet(s) Filed in Color)

(51) Int. Cl.
    *B33Y 80/00*     (2015.01)
    *C08L 83/06*     (2006.01)
    *B29C 64/295*     (2017.01)
    *B33Y 30/00*     (2015.01)
    *B29C 64/209*     (2017.01)
    *B29C 64/227*     (2017.01)
    *B33Y 50/02*     (2015.01)

(52) U.S. Cl.
    CPC ............ *B29C 64/295* (2017.08); *B33Y 30/00* (2014.12); *B33Y 50/02* (2014.12); *B33Y 70/10* (2020.01); *B33Y 80/00* (2014.12); *C08L 83/06* (2013.01)

(56) References Cited

U.S. PATENT DOCUMENTS

| | | |
|---|---|---|
| 2016/0297104 A1 | 10/2016 | Guillemette et al. |
| 2016/0332382 A1 | 11/2016 | Coward et al. |
| 2017/0312981 A1 | 11/2017 | Selbertinger et al. |
| 2018/0036952 A1* | 2/2018 | Hocker ............... B29C 48/21 |
| 2018/0186076 A1 | 7/2018 | Backer et al. |
| 2018/0281276 A1* | 10/2018 | Milroy ............... C08L 83/04 |
| 2018/0361657 A1* | 12/2018 | Powale ............... B33Y 70/00 |
| 2019/0270240 A1 | 9/2019 | Wolf et al. |
| 2020/0131364 A1* | 4/2020 | Luo ............... B33Y 70/00 |
| 2021/0187825 A1* | 6/2021 | Besch ............... B29C 64/336 |
| 2022/0193982 A1* | 6/2022 | Yamasue ............... D01F 8/14 |
| 2022/0274318 A1* | 9/2022 | Shan ............... B29C 64/118 |

OTHER PUBLICATIONS

N. Kumar et al., "3D Printing of Flexible Parts Using EVA Material," Materials Physics and Mechanics 37, Dec. 22, 2017, pp. 124-132.

N. Kumar et al., "Additive Manufacturing of Flexible Electrically Conductive Polymer Compositions Using CNC-Assisted Fused Layer Modeling Process," Journal of the Brazilian Society of Mechanical Sciences and Engineering, 40-175, 2018, pp. 1-13.

A. Paolini, et al. "Additive Manufacturing In Construction: A Review on Processes, Applications, and Digital Planning Methods," Elsevier, Additive Manufacturing 30, 2019, pp. 1-13.

D. Vink, "World Summit Probes LSR 3D Printing," Rubber News, Rubber & Plastic News, May 6, 2019, pp. 19.

International Search Report and Written Opinion dated Jul. 12, 2021 in corresponding International Patent Application Serial No. PCT/US2021/025274, 3 pages.

* cited by examiner

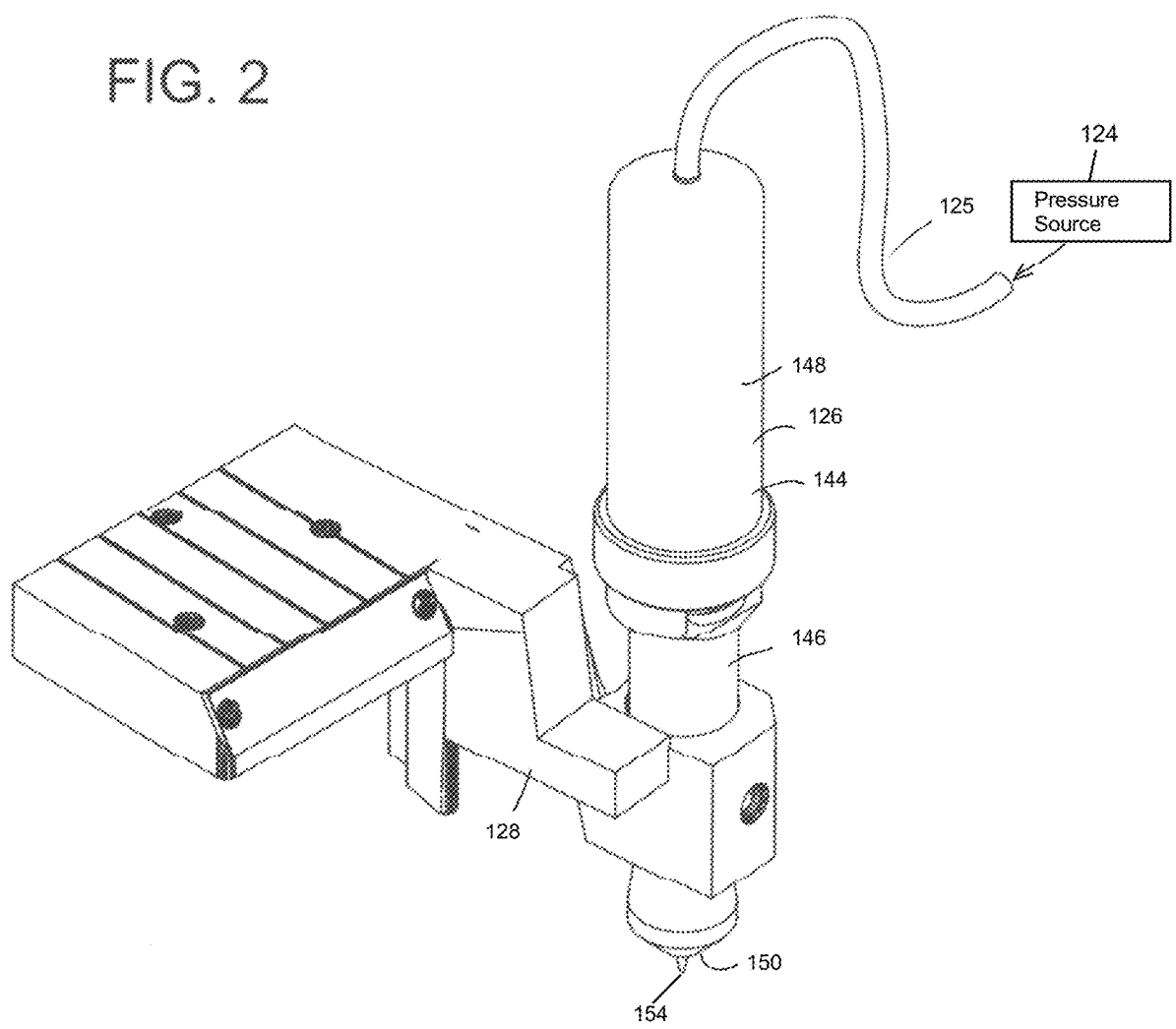

FIG. 16
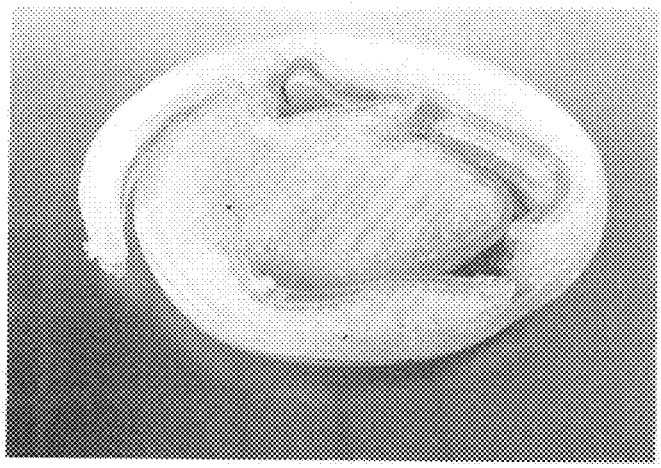
FIG. 18
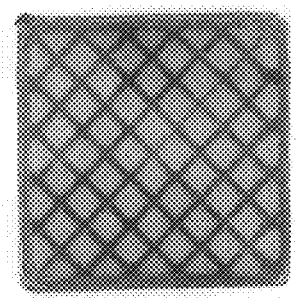
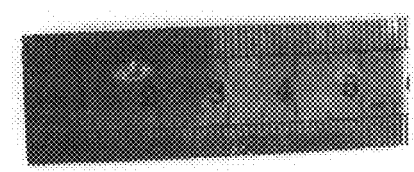
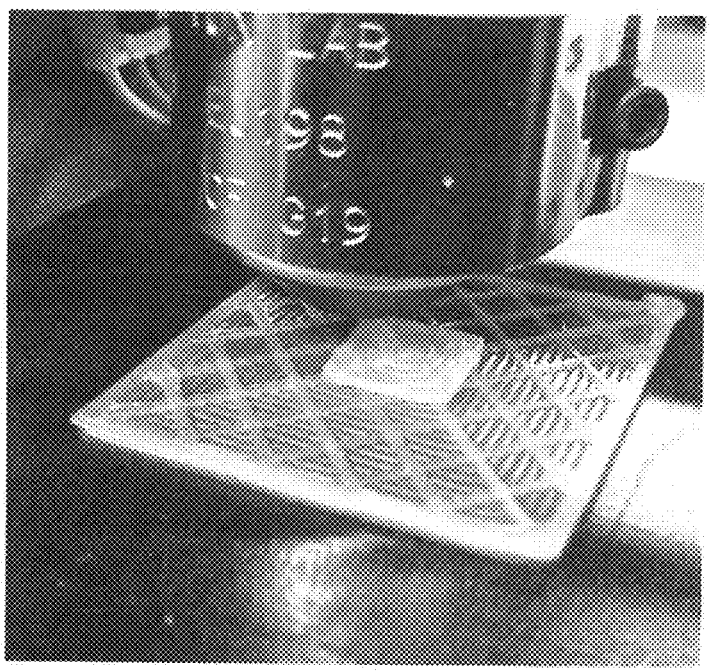
FIG. 17
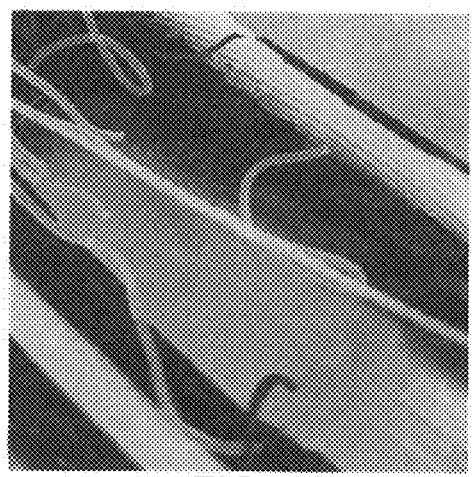
FIG. 19

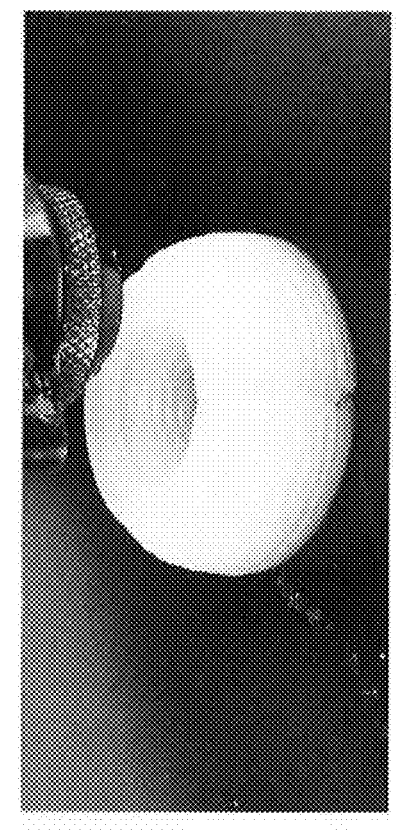
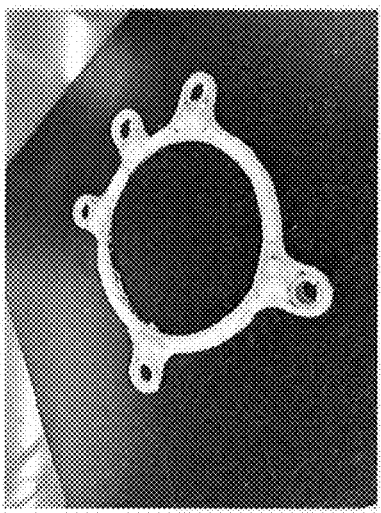
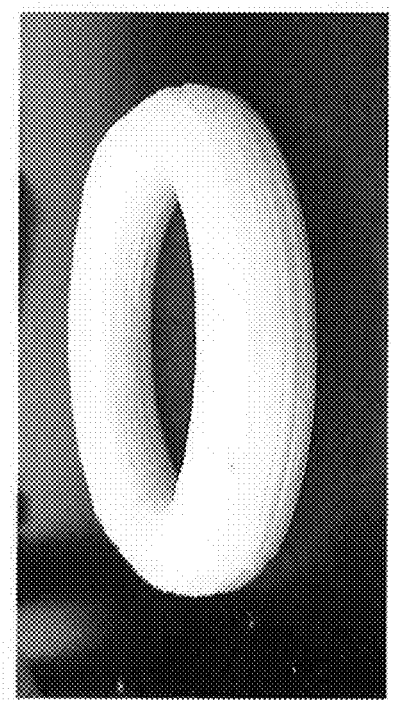
FIG. 24A

METHOD FOR FORMING LAYERED THERMOSET SILICONE AND THERMOPLASTIC ARTICLES USING ADDITIVE MANUFACTURING, ARTICLES FORMED THEREFROM AND APPARATUS FOR USE THEREIN

CROSS-REFERENCE TO RELATED APPLICATIONS

This non-provisional patent application claims priority to and the benefit under 35 U.S.C. § 119(e) of U.S. Provisional Patent Application No. 63/003,146, entitled, "Method For Forming Layered Thermoset Silicone and Thermoplastic Articles Using Additive Manufacturing, Articles Formed Therefrom and Apparatus for Use Therein," the entire disclosure of which is incorporated herein by reference.

BACKGROUND OF THE INVENTION

Field of the Invention

The invention relates the field of additive manufacturing, particularly additive manufacturing of composites comprising thermoset elastomers, including composites having silicone-containing elastomers, through fused filament fabrication and deposition.

Description of Related Art

Additive manufacturing, also commonly referred to as three-dimensional ("3D") printing, is increasing in popularity for rapid prototyping and commercial production of articles. Various types of additive manufacturing processes are known, including vat photopolymerization methods such as stereolithography ("SLA"), material or binder jetting methods, powder bed fusion methods such as selective laser sintering ("SLS"), and material extrusion methods such as fused deposition modeling ("FDM"), fused-filament fabrication ("FFF") and direct pellet extrusion, among others.

In vat photopolymerization methods, a liquid photopolymer resin is stored in a vat in which a build platform is positioned. An article can be formed based on a computer model of the article in which the article is represented as a series of layers or cross sections. Based on the computer model, a first layer of the article is formed using UV light to selectively cure the liquid photopolymer resin. Once the first layer is formed, the build platform is lowered, and the UV light is used to cure the liquid photopolymer resin so as to form a subsequent layer of the article on top of the first layer. This process is repeated until the printed article is formed.

In material jetting methods, an article is prepared in a layer-by-layer manner by depositing drops of a liquid material, such as a thermoset photopolymer, to form a first layer of the article based on a computer model of the article. The deposited layer of liquid material is cured or solidified, such as by the application of UV light. Subsequent layers are deposited in the same manner so as to produce a printed article. In binder jetting, an article is formed by depositing a layer of a powdered material on a build platform and selectively depositing a liquid binder to join the powder. Subsequent layers of powder and binder are deposited in the same manner and the binder serves as an adhesive between powder layers.

In powder bed fusion methods, and specifically SLS, an article is formed by generating a computer model of the article to be printed in which the article is represented as a series of layers or cross-sections. To prepare the article, a layer of powder is deposited on a build platform and the powder is sintered by the use of a laser to form a layer of the article based on the computer model. Once the layer is sintered, a further layer of powder is deposited and sintered. This process is repeated as necessary to form the article having the desired configuration.

In material extrusion methods, such as FDM or FFF, a computer model of an article is generated in which the article is represented as a series of layers. The article is produced by feeding a filament of material to an extruding head which heats the filament and deposits the heated filament on a substrate to form a layer of the article. Once a layer is formed, the extruding head proceeds to deposit the next layer of the article based upon the computer model of the article. This process is repeated in a layer-by-layer manner until the printed article is fully formed. Similarly, in direct pellet extrusion, pellets rather than filaments are used as the feed material, and the pellets are fed to an extruding head and are heated and deposited onto the substrate.

A variety of polymeric materials are known for use in additive manufacturing methods. Common polymeric materials used in additive manufacturing include acrylonitrile butadiene styrene (ABS), polyurethane, polyamide, polystyrene, and polylactic acid (PLA). More recently, high performance engineering thermoplastics have been used to produce printed articles with improved mechanical and chemical properties relative to common polymer materials. Such high-performance thermoplastics include, polyaryletherketones, polyphenylsulfones, polycarbonates, and polyetherimides.

While additive manufacturing methods can be used to rapidly form an article having any of various shapes and configurations, articles formed by additive manufacturing processes can suffer from weak inter-layer adhesion in the z-direction of the printed article.

Currently, additive manufacturing using material extrusion three-dimensional printing (ME3DP) based on FFF and FDM is considered a highly flexible and efficient additive manufacturing technique. In this process, a thermoplastic filament is heated and then "extruded" and fused to an underlying layer. This technique is viewed in that art as potentially useful for developing manufactured components with more complex geometries using computer-assisted design.

In addition to using the materials used as noted above, there have been further attempts to develop techniques using FFF for printing soft thermoplastic elastomers such as ethylene vinyl acetate (EVA), ethylene-propylene diene monomer in a polypropylene matrix (EPDM+PP), acrylonitrile-butadiene-styrene (ABS) and styrene-ethylene-butadiene-styrene (SEBS). However, such materials present challenges in processing using FFF to form articles. See, N Kumar et al., "3D Printing of Flexible Parts Using EVA Material," Materials Physics and Mechanics 37, pp. 124-132 (2018); N. Kumar et al., "Additive Manufacturing of Flexible Electrically Conductive Polymer Compositions Using CNC-Assisted Fused Layer Modeling Process," Journal of the Brazilian Society of Mechanical Sciences and Engineering, 40:175 (2018) and K. Elkins et al., "Soft Elastomers for Fused Deposition Modeling," Virginia Polytechnic Institute and State University, presented in the International Solid Freeform Fabrication Symposium (1997).

As such materials are soft, they tend to lack adequate compression set and heat resistance for many applications. To provide better performance, they are generally prepared for use in the form of a compounded elastomer (i.e., a curable elastomer composition for vulcanization including a curable polymer, one or more fillers, and generally also a cure system). As such materials are processed, they form a network structure in the crosslinked rubber system that can negatively impact the ability to fabricate objects using layered FFF technology. There is a need in the art for development of such a technique as such networked structures offer the potential of finished products which should include strong interfacial bonding provided there was the ability to form them successfully with FFF or another additive technology.

It is further an issue in the art for development of additive processible compounds in the elastomer area that the processing characteristics of a fully compounded curable elastomeric composition are quite different from the processing characteristics of thermoplastics such as those noted above that are typically used in FFF processing. When attempting to introduce elastomers to additive manufacturing processes, particularly in the case of thermoset elastomers, in a curable compounded form, caution has to be taken to keep the materials below their cure temperature for the purpose of processing the material before curing it. Such materials when not heated present further challenges for processing as they generally have a high viscosity (a problem usually addressed by application of heat), and the need to prevent and hold off forming of crosslinks while processing and prior to intentional curing.

Feeding of flexible filaments using currently available three-dimensional printing equipment also poses a challenge due to such viscosity and cure-prevention needs, including preventing problems which arise due to buckling of the filament.

While such developments have occurred to date, it is desirable to find a method that would enable printing of high performance elastomers, such as silicone elastomers, that are formed from curable thermoset silicon-containing polymers that are suitable for end uses such as, but not limited to, use in semiconductor, downhole tooling, medical devices, aerospace, defense and various other applications and markets, however, many such parts in addition to having to broad operating environments, also require formation of complex geometries and require the need for cost effective formation processes with stronger interlayer adhesion upon printing to meet end use demands.

One way to reduce cost of formation of such parts and/or modify their properties to achieve acceptable end use properties introduced by applicants herein would be to adapt an additive manufacturing method that would enable introduction of composites of difficult-to-print and/or expensive-to-print elastomers by introducing a further material with such elastomers. Forming such a composite prepared through additive manufacture provides one material in the composite to reinforce and help to strengthen the elastomer while also reducing the cost of manufacture and making preparing of articles using such elastomers easier to print three-dimensionally. Thus, there are needs in the art for additive manufacturing of composite parts including high-performance elastomers that can provide a variety of versatile properties while maintaining an economical method for manufacture, which needs are met by the methods, composites and printed articles of applicants herein.

BRIEF SUMMARY OF THE INVENTION

The invention includes a method for forming composite articles comprising thermoset silicon-containing polymers, and articles formed therefrom as well as an apparatus related thereto. The disclosure includes one of more of the following embodiments.

In one embodiment, the invention includes a method for forming composite articles comprising thermoset silicon-containing polymers, comprising: providing a first composition comprising a first thermoset silicon-containing polymer; providing a thermoplastic composition; printing, using an additive manufacturing device: (i) a first at least partial layer of the first composition comprising the first thermoset silicon-containing polymer using an additive manufacturing device; and (ii) an at least partial reinforcing layer comprising the thermoplastic composition, wherein the first at least partial layer of the first composition comprising the first thermoset silicon-containing polymer and the at least partial reinforcing layer are printed either to be within the same layer or in successive layers.

In the method, the first at least partial layer of the first composition comprising the first thermoset silicon-containing polymer may be printed on a substrate. The first at least partial layer of the first composition comprising the first thermoset silicon-containing polymer and the at least partial reinforcing layer may be complete individual layers printed in at least two successive layers. In such embodiment, the first at least partial layer of the first composition comprising the first thermoset silicon-containing polymer is printed on a substrate.

Alternatively, the first at least partial layer of the first composition comprising the first thermoset silicon-containing polymer and the at least partial reinforcing layer may be printed so as to be within a single layer.

The first thermoset silicon-containing polymer may comprise at least one polymer selected from the group of a polysiloxane; a polyalkylsiloxane; a polydialkylsiloxane; and combinations, or co-polymers thereof. The first thermoset silicon-containing polymer may also comprises at least one functional group selected from the group consisting of hydroxyl, alkyl, alkenyl, alkynyl, aryl, alkoxy, alkenoxy, alkynoxy, aryloxy, arylalkyl, arylalkoxy, arylalkenoxy, vinyl, carboxyl, carbonyl, halogen, heterocyclic, and fluorinated and perfluorinated groups thereof.

The first composition comprising the first thermoset silicon-containing polymer may comprise one or components selected from the group consisting of a curative, a cure catalyst, an organic peroxide, a hydrolytic crosslinker, a siloxane additive, an ultra-high-molecular-weight siloxane additive, clarifiers, UV absorbers, optical brighteners, pigments, colorants, stabilizers, flame-retardants, quartz, pyrogenic silica, carbon black, fluorinated or perfluorinated polymer additives, and nanosilica dioxide particles.

The thermoplastic composition may comprise at least one thermoplastic selected from the group consisting of polyolefins, polyoxymethylene, polyamides, polyesters, polyimides, polyarylene ethers, polyarylene ether ketones, polyarylene ether sulfones, polyphenylene oxide blended with polystyrene, polyacrylonitrile-butadiene-styrene, polystyrene-acrylonitrile, polyacrylonitrile, polystyrene, polyethylene terephthalate, polyethylene terephthalate glycol, thermoplastic elastomers and thermoplastic polyurethanes, and copolymers, blends, alloys and derivatives thereof. The reinforcing layer may comprise fibers.

The method may further comprise printing one or more additional at least partial layers of the first composition comprising the first thermoset silicon-containing polymer on the first at least partial layer thereof prior to printing the at least partial reinforcing layer.

The method may further comprise printing one or more additional at least partial reinforcing layers comprising the thermoplastic composition on the at least partial reinforcing layer.

The method may further comprise successively, and in an alternating manner, printing one or more additional at least partial layers of the first composition comprising the first thermoset silicon-containing polymer and one or more additional at least partial reinforcing layers comprising the thermoplastic composition on the at least one reinforcing layer.

The method may further comprising compression molding the article formed by the method into a modified article.

The invention also includes a three-dimensional article formed from the various method embodiments noted above and described herein. The article may have a composite structure comprising at least one at least partial layer of the first composition comprising the thermoset silicon-containing polymer and at least one partial layer of the reinforcing composition comprising the thermoplastic.

The method may further comprise (e) providing a second composition comprising a second thermoset silicon-containing polymer; and (f) printing at least partial first layer of the second composition comprising the second thermoset silicon-containing polymer on the at least partial reinforcing layer using an additive manufacturing device.

In such an embodiment, the first at least partial layer of the second composition comprising the second thermoset silicon-containing polymer may be a complete layer and the at least partial reinforcing layer may be a complete layer. Alternatively, the first at least partial layer of the second composition comprising the second thermoset silicon-containing polymer and the at least partial reinforcing layer may also be printed so as to be within a single layer, which may itself be a complete or partial layer or, in some embodiments a patterned layer.

The first thermoset silicon-containing polymer and/or any second thermoset silicon-containing polymer may each independently comprise at least one polymer selected from the group of a polysiloxane; a polyalkylsiloxane; a polydialkylsiloxane; and combinations, or co-polymers thereof.

The first thermoset silicon-containing polymer and/or the second thermoset silicon-containing polymer may also independently comprise at least one functional group selected from the group consisting of hydroxyl, alkyl, alkenyl, alkynyl, aryl, alkoxy, alkenoxy, alkynoxy, aryloxy, arylalkyl, arylalkoxy, arylalkenoxy, vinyl, carboxyl, carbonyl, halogen, heterocyclic, and fluorinated and perfluorinated groups thereof.

The first composition comprising the first thermoset silicon-containing polymer and/or the second composition comprising the second thermoset silicon-containing polymer may independently comprise one or components selected from the group consisting of a curative, a cure catalyst, an organic peroxide, a hydrolytic crosslinker, a siloxane additive, an ultra-high-molecular-weight siloxane additive, clarifiers, UV absorbers, optical brighteners, pigments, colorants, stabilizers, flame-retardants, quartz, pyrogenic silica, carbon black, fluorinated or perfluorinated polymer additives, and nanosilica dioxide particles.

The first thermoset silicon-containing polymer and the second thermoset silicon-containing polymer may be the same or different.

The thermoplastic composition in this embodiment may comprise at least one thermoplastic selected from the group consisting of polyolefins, polyoxymethylene, polyamides, polyesters, polyimides, polyarylene ethers, polyarylene ether ketones, polyarylene ether sulfones, polyphenylene oxide blended with polystyrene, polyacrylonitrile-butadiene-styrene, polystyrene-acrylonitrile, polyacrylonitrile, polystyrene, polyethylene terephthalate, polyethylene terephthalate glycol, thermoplastic elastomers and thermoplastic polyurethanes, and copolymers, blends, alloys and derivatives thereof.

The method may further comprise printing one or more successive at least partial layers of the first composition comprising the first thermoset silicon-containing polymer on the first at least partial layer thereof prior to printing the at least partial reinforcing layer.

The method may further comprise printing one or more successive at least partial reinforcing layers comprising the thermoplastic composition prior to printing the first at least partial layer of the second composition comprising the second thermoset silicon-containing polymer.

The method may further comprise printing one or more successive at least partial layers of the second composition comprising the second thermoset silicon-containing polymer on the first at least partial layer of the second composition comprising the second thermoset silicon-containing polymer.

The method may further comprise successively, and in an alternating manner, printing one or more additional at least partial layers of the first composition comprising the first thermoset silicon-containing polymer, one or more additional at least partial reinforcing layers comprising the thermoplastic composition, and one or more additional at least partial layers of the second composition comprising the second thermoset silicon-containing polymer according to a designed pattern on the first at least partial layer of the second composition comprising the second silicon containing polymer.

In the method, each of the at least partial layers of the first composition comprising the first thermoset silicon-containing polymer, each of the at least partial reinforcing layers comprising the thermoplastic composition, and each of the at least partial layers of the second composition comprising the second thermoset silicon-containing polymer may be printed as a complete layer. Alternatively, one or more of them may be printed in partial layers alone or together with other such polymer and reinforcing layers.

The method may further comprise compression molding the article formed by the method into a modified article.

The method may further comprise repeating steps (c), (d) and (f) noted above to form an article based on a computer design model. The article may comprise a configuration that is a tubular or a cylindrical solid article.

A three-dimensional article may be formed by the embodiments of the method noted above having a first and second thermoset silicon-containing polymer and as described herein, may have a composite structure comprising at least one of the following at least partial layers formed of the first composition comprising the thermoset silicon-containing polymer, the reinforcing composition comprising the thermoplastic and the second composition comprising a thermoset silicon-containing polymer.

In one embodiment, the article may be, for example, and without intending to be limiting, an O-ring, a seal, a gasket, a medical device, a medical implant, or a component part thereof.

The three-dimensional article may be further subjected to compression molding to form a modified article.

The invention further includes an apparatus for preparing a composite article comprising thermoset silicon-containing polymers, comprising: an additive manufacturing printer having a printer drive mechanism; a first printing nozzle for forming a first at least partial layer of a first composition; and a second printing nozzle for forming a second at least partial layer of a second composition, wherein the additive manufacturing printer is capable of providing two or more at least partial layers of each of the first and the second composition to form a three-dimensional composite article of the first and the second compositions according to a computer design model, and wherein at least one of the first printing nozzle and the second printing nozzle is a pressurized printing nozzle comprising a heating mechanism in operable contact therewith. The first composition and the second composition may be the same or different. The first composition may comprise a first thermoset silicon-containing polymer and the second composition may comprise either a second thermoset silicon-containing polymer or a thermoplastic polymer.

The first composition may comprise the first thermoset silicon-containing polymer and the second composition may comprise the second thermoset silicon-containing polymer, and each of the first nozzle and the second nozzle may be a pressurized nozzle. In such an embodiment, the first thermoset silicon-containing polymer and the second thermoset silicon-containing polymer may be the same.

The apparatus may comprise a third printing nozzle for forming a third layer of a third composition. The third composition is the same as the first and/or the second compositions or may be different.

The at least one of the printing nozzles may be operably programmed in the computer design model to print an at least partial layer according to a design pattern. The at least partial layer that is in a design pattern may be a thermoplastic layer. The first and/or the second composition may be in the form of a filament.

The first nozzle and the second nozzle may be part of a nozzle assembly that further includes a mounting arm to stably hold the first nozzle and the second nozzle in position for tandem operation. The mounting arm may have a transversely extending support portion for supporting the second nozzle and a seat support portion having an opening therethrough to support the first nozzle.

The nozzle assembly may further comprise a nozzle assembly printer drive mechanism. The first nozzle may be a high pressure piston extruder. The first nozzle may be in communication with a pressurized source. The first nozzle may have a nozzle end portion and a heating band adapted to be positioned around the nozzle end portion for heating a composition having a thermoset silicon-containing polymer as it is printed by the nozzle.

The second nozzle may be a thermoplastic nozzle extruder. The second nozzle may be a fiber nozzle extruder.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. At least one drawing executed in color is included herein. Copies of this patent or patent application publication with color drawings will be provided by the Office upon request and payment of the necessary fee. In the drawings:

FIG. 2 is an enlarged front perspective view of a print nozzle and mounting arm for use in the apparatus of FIG. 1;

FIG. 16 is a photographic representation of an example composite part formed using the apparatus of FIG. 1 and the method herein using an embedded nylon mesh design layer and silicone;

FIG. 17 is a photographic representation of a composite article in the process of printing showing a layer of mesh nylon under a partial layer of silicone;

FIG. 18 is a photographic representation of a completed composite article showing a dark mesh seen through layers of silicone;

FIG. 19 is a photographic representation of a printed silicone and acrylonitrile-butadiene-styrene (ABS) composite article with layers of silicone (in white) and layers of ABS (in black) as a reinforcing layer;

Figure 21:
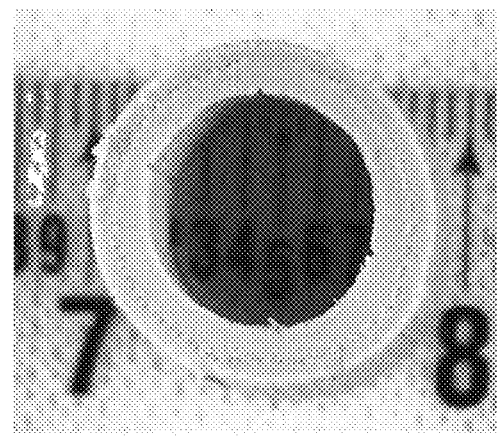
FIG. 21 is a photographic image of a three-dimensional tubular composite article formed using layers of silicone and nylon filament in layered composite in the Examples herein.
Figure 21A:
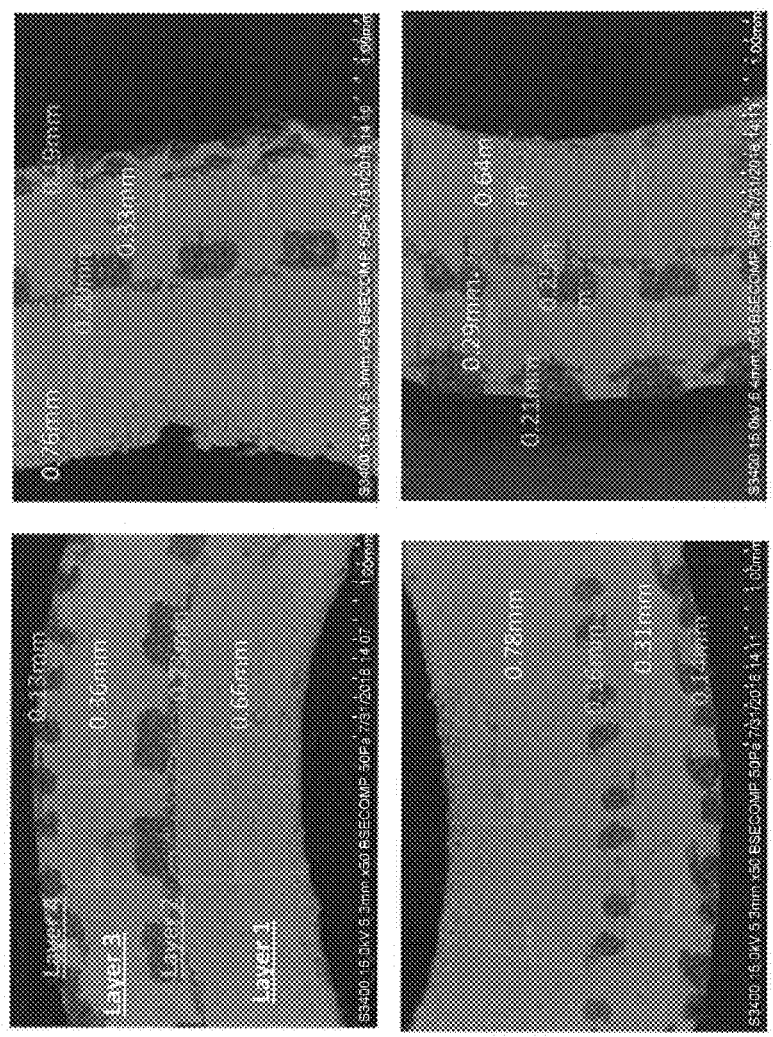
Figure 22:
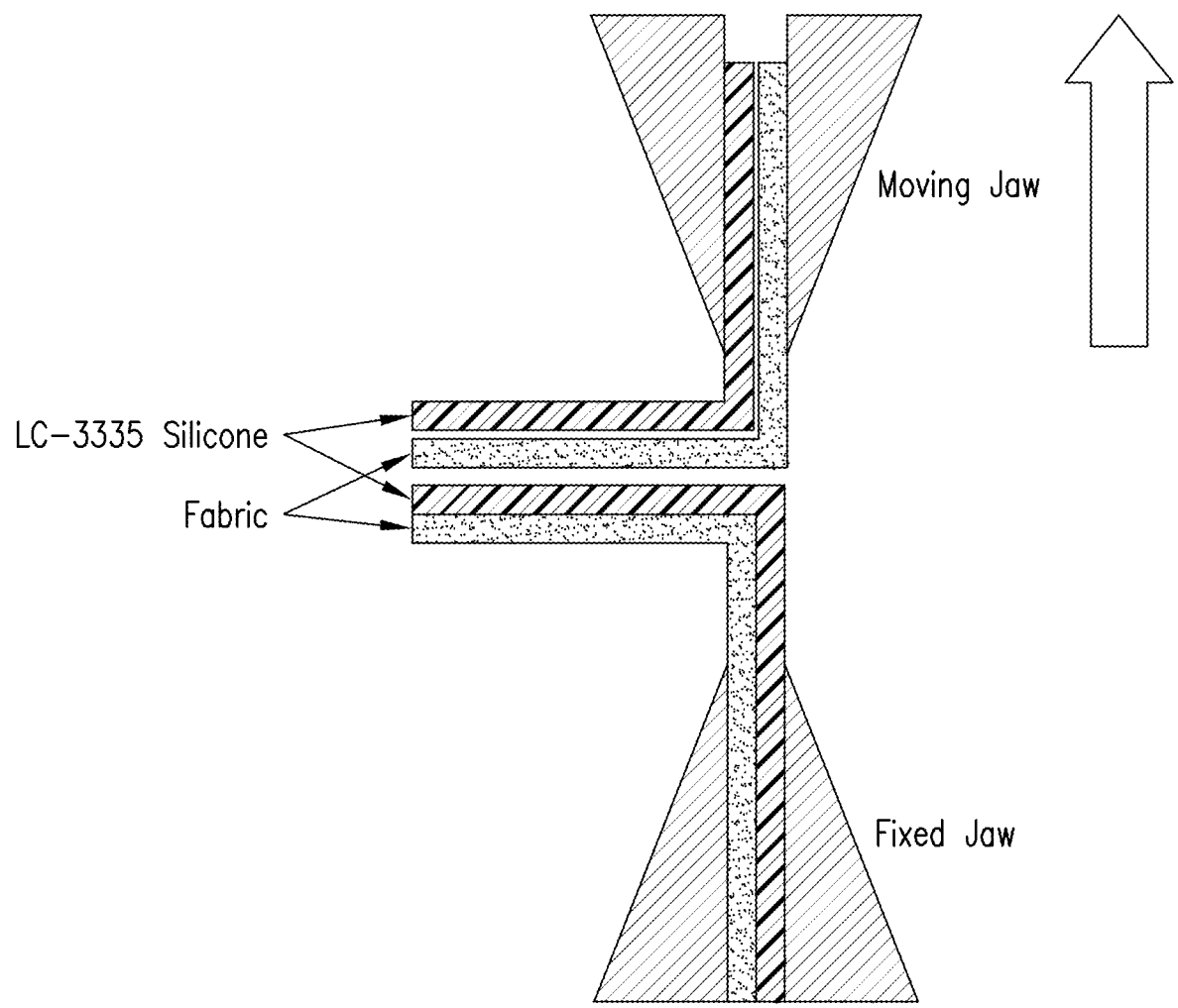
Figure 22A:
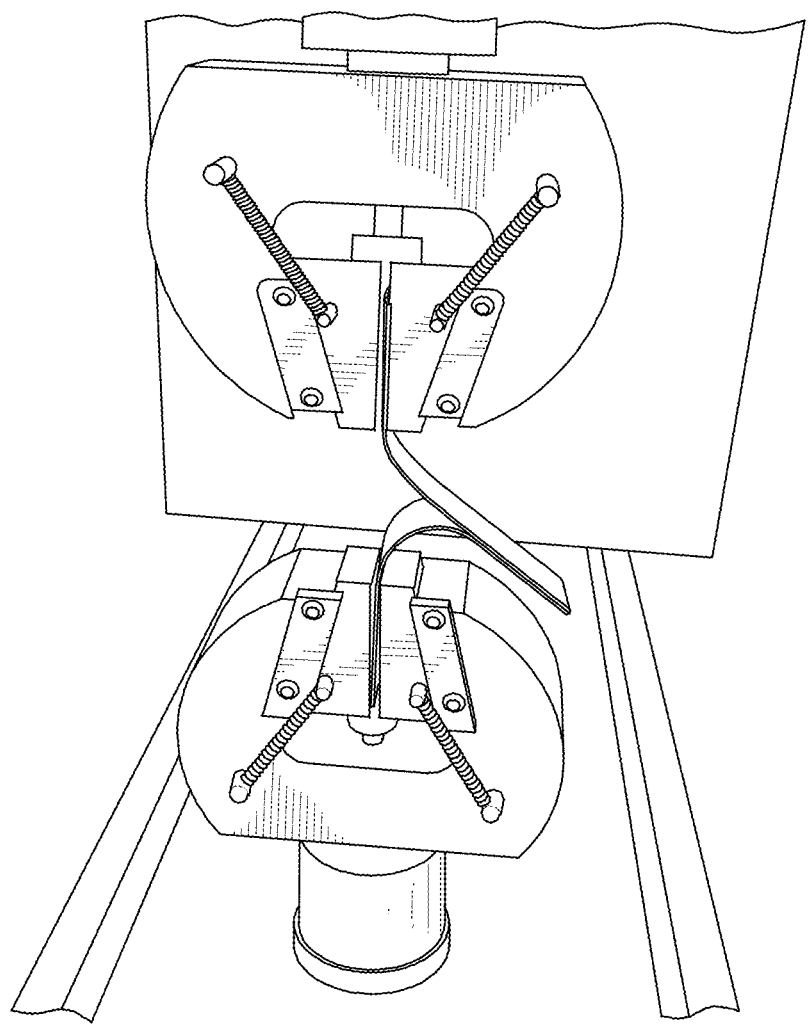
Figure 23A:
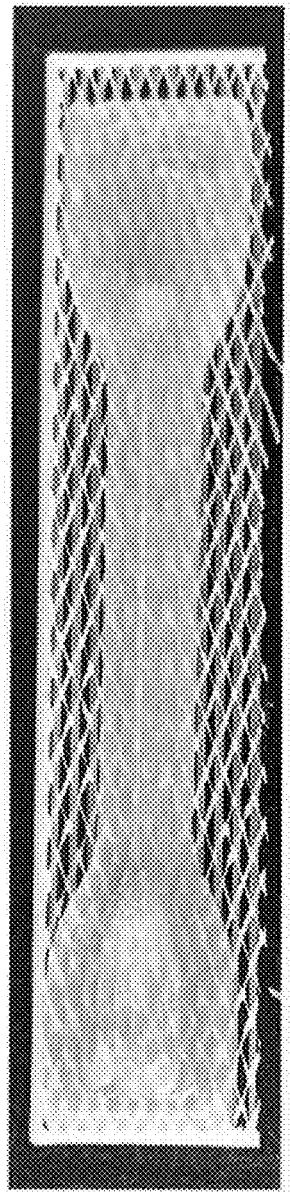
Figure 23B:
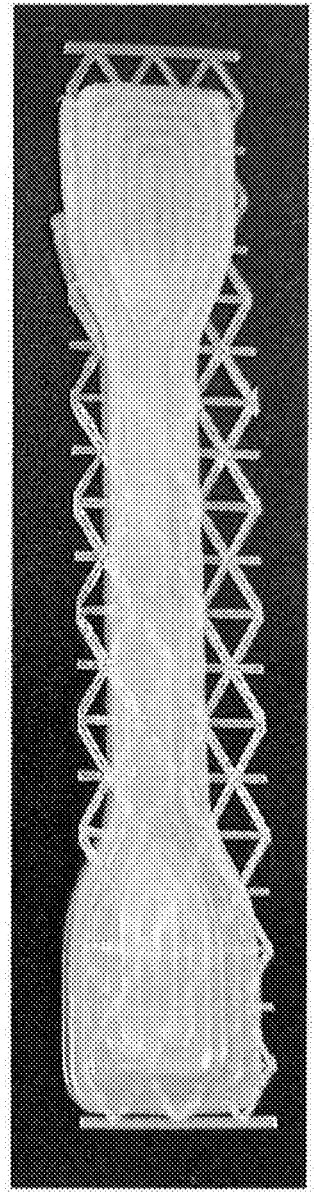
Figure 24B:
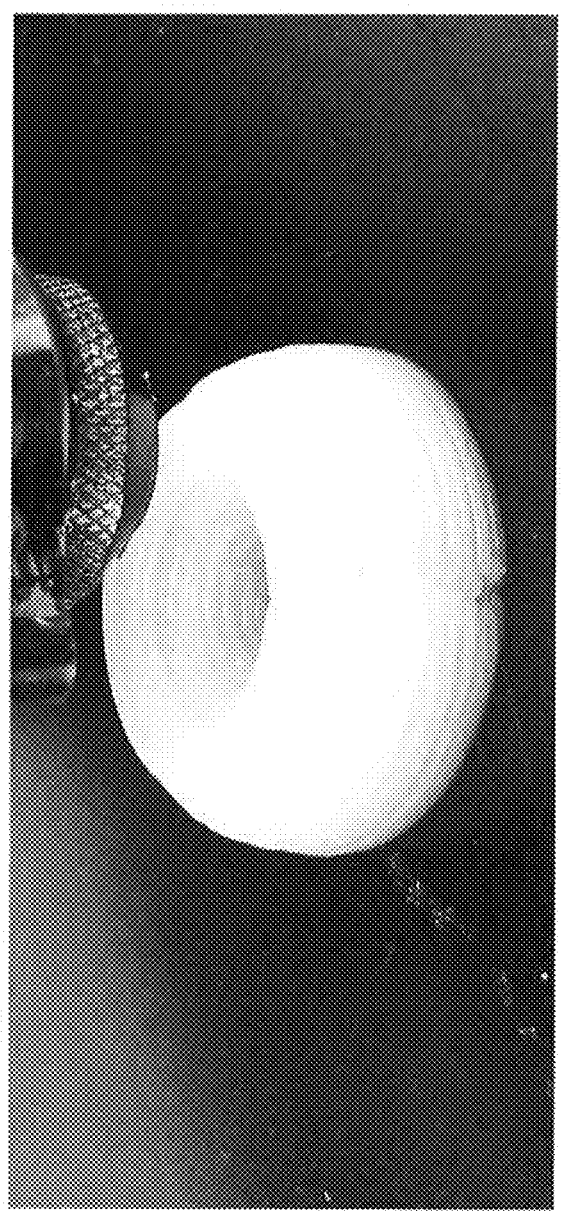
Figure 25:
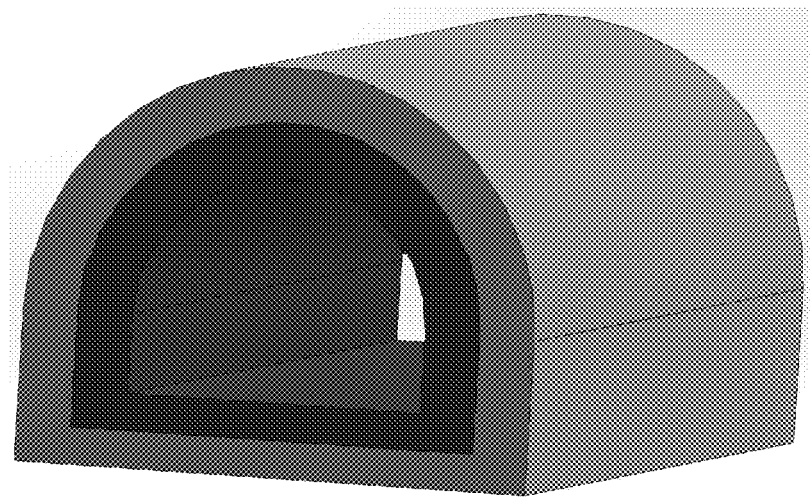
Figure 26:
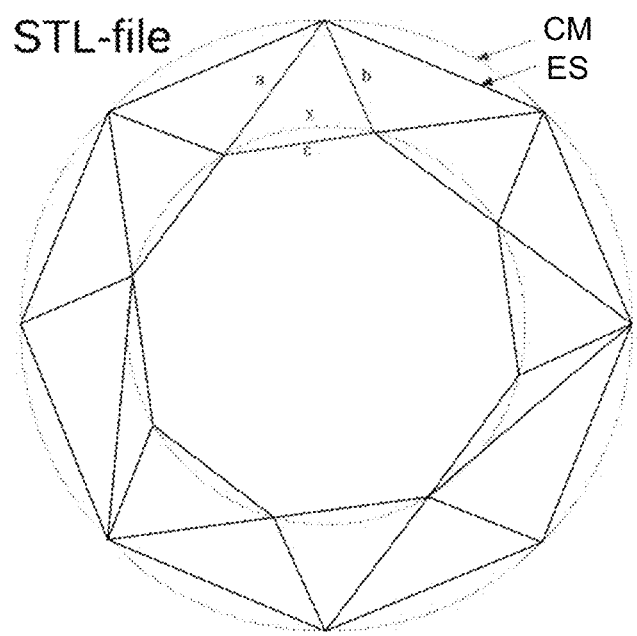
Figure 27:
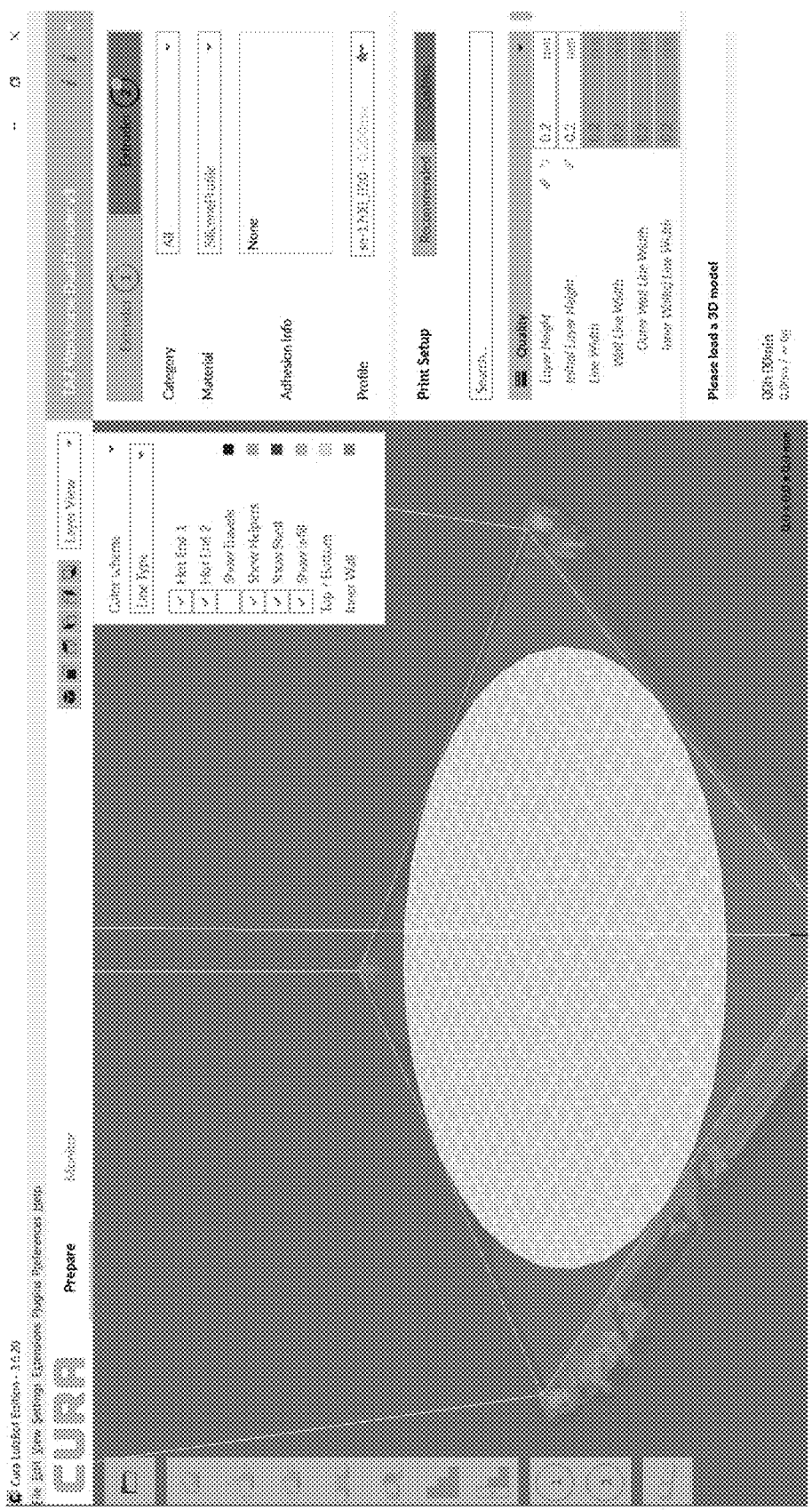
Figure 29:
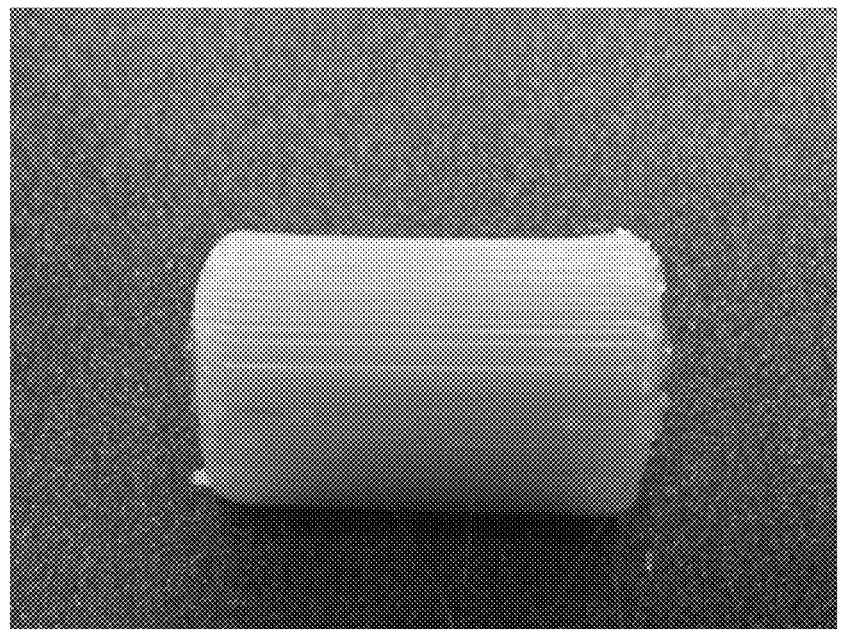
Figure 30:
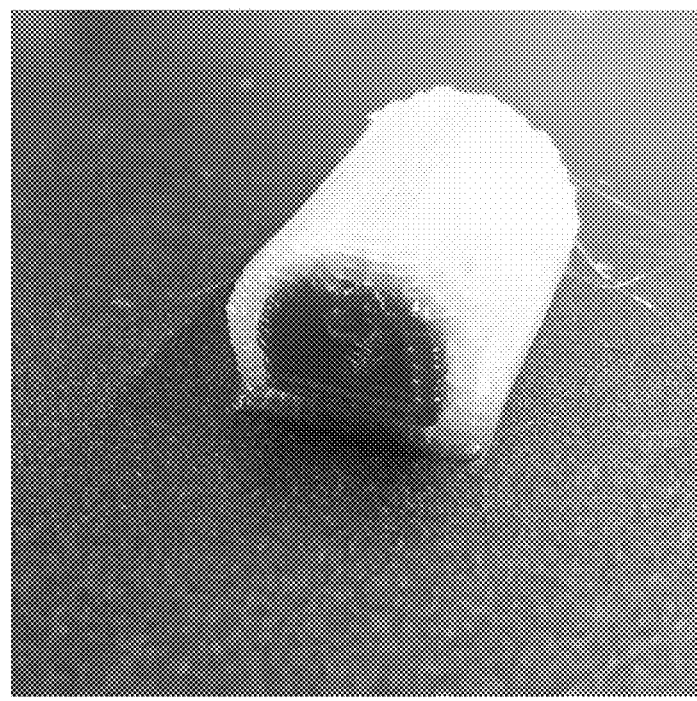

FIG. 21A includes SEM representations of the sample in FIG. 21;

FIG. 22 is graphical representation of a peel test used for measuring inner-layer adhesion in a three layer flat composite article for testing;

FIG. 22A is a front perspective of a test machine used in the Examples herein;

FIG. 23A is a photographic representation of a composite article formed using a 0-20-340 nylon 6,6 mesh reinforcing layer with a layer of silicone;

FIG. 23B is a photographic representation of a composite article formed using a triangle nylon 6.6 nylon 6,6 mesh reinforcing layer with a layer of silicone;

FIG. 24A are photographic representations of composite articles in the form of O-rings formed using nylon 6,6 and silicone layers;

FIG. 24B is a three dimensional complex composite article formed using nylon 6,6 and silicone layers;

FIG. 25 is a representative screen capture of a three-dimensional model from SolidWorks® used in Example 4;

FIG. 26 is example of an .STL format file showing the differences between a curved model identified as CM and an exported .STL model identified as ES for explaining the print procedure in Example 4 herein;

FIG. 27 is a representative example of a screenshot of a Cura™ LulzBot™ 3.6.20 interface;

Figure 28:
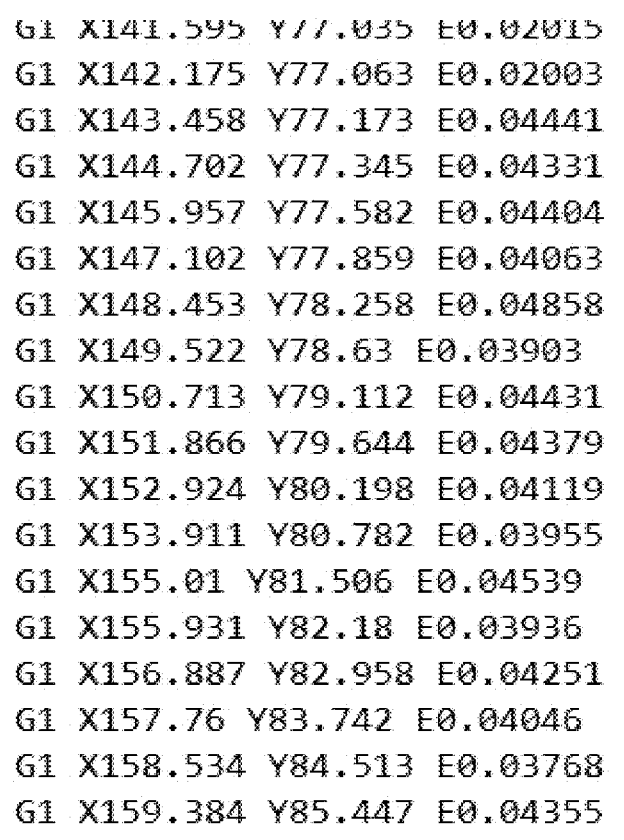

FIG. 28 is an example of several lines of G-Code employed in the software associated with printer used in Example 4 herein;

FIG. 29 is a top plan view and photographic image of the tubular item printed using the procedure in Example 4 herein showing an internal shell of reinforcing TPU (red) and an exterior shell of silicone (white); and FIG. 30 is a perspective view of the tubular item of FIG. 29.

DETAILED DESCRIPTION OF THE INVENTION

The present invention includes methods and an apparatus for forming composite three-dimensional elastomer articles formed using additive manufacturing, including composites including a thermoset silicon-containing polymer. The composites may also include a reinforcing layer(s) of thermoplastic material.

In the description herein, words like "inner" and "outer," "upwardly" and "downwardly," inwardly" and "outwardly," "right" and "left," "upper" and "lower," "distal" and "proximal" and words of similar import refer to directions in the drawings for assisting in clarifying the features of the invention unless otherwise specified.

As used herein a "thermoset silicon-containing polymer" may be any of a variety of silicone homopolymers and co-polymers that are curable to form a silicone elastomer (also referred to as a silicone rubber). Silicones are generally polymers that incorporate at least silicon, oxygen and hydrogen in their chemical structure. Curable thermoset silicon-containing polymers (silicones) which may be used to form silicone elastomers include polymers having a backbone as classified by the Standard Rubber Nomenclature definitions provided by ASTM International in ASTM D1418-17 as VMQ (silicones), PVMQ (phenylsilicones) and FVMQ (fluorosilicones). However, silicones that are not readily classified by ASTM D1418-17 may also be used provided they demonstrate useful additive manufacturing printable characteristics as described herein.

"Curing" as used herein is meant to encompass any method of providing an elastomeric structure to a silicone by either vulcanization, chemical crosslinking, catalyzed crosslinking and the like. After curing, thermoset silicon-containing polymers (silicones) form silicone elastomers. An "elastomer" (also sometimes referred to as a rubber) as used herein is intended to mean a polymeric material that has viscoelastic properties, and that upon application of a stress will deform, but after removal of the stress, will recover a portion of its original form. The degree to which the material recovers its original form is an elastomer property typically measured through its "compression set" resistance (the percentage of the elastomer that is not recovered upon removal of stress, thus the lower the percentage of compression set resistance, the stronger the elastomeric recovery). Other elastomer properties typically measured include elongation at break, Young's modulus, tensile modulus, viscosity, and other physical properties. Thermal behavior of elastomers and their cure system's impact on such properties are also useful for evaluation of an elastomer for various end use applications.

In additive manufacturing, the thermal behavior, flowability and viscosity are all properties that must be evaluated as the silicone will behave differently depending on thermal properties, including its glass transition temperature ($T_g$), its speed of curing and its state of curing during printing. As most silicone elastomers are thermosetting in nature, they are more difficult to use in applications where thermoplastics are more readily useful and economically feasible. Thus, there is still a need in the art for methods for using silicone elastomers in additive printing that is addressed herein.

In an uncured state, a silicone is typically a liquid or an adhesive gel. Silicones for forming silicone rubber can be cured using a variety of curing systems, including catalyst cure systems, typically using a platinum-based catalyst, a condensation curing system, a peroxide cure system and an oxime cure system.

In platinum catalyst curing, crosslinks are formed using functional silicone polymers such as vinyl-functional silicones and hydride-functional silicones through addition reactions to form the crosslinks. Such reaction leaves no byproducts and so is a preferred pathway for curing in the art.

Condensation systems typically involve a crosslinking material that is activated in some manner. In a common one-part system, functional silicones are employed that when contacted with water at room temperature will undergo hydrolysis and the hydrolyzable groups (hydroxyl or silanol groups) will initiate the curing reaction. The hydrolysis reaction once initiated continues until curing is done, and can take place at room temperature. Crosslinking materials include for condensation systems including functional silanes having active oxygen containing groups such as alkoxy, acetoxy, ester, enoxy or oxime silanes, e.g., methyltrimethoxysilane, methyltriacetoxysilane and similar materials. Such substituted groups and/or functionalized groups can be catalyzed as well if desired using organometallic catalysts such as tetraalkoxytitanates, chelated titanates, tin catalysts (e.g., dibutyl tin dilaurate and acetoxy tin).

In a two-part condensation, the crosslinking material and any catalyst is retained in one container while the curable silicone polymer composition (absent those materials) is retained in a separate container. The curing is initiated upon mixing of the materials in the two containers.

Other silicone cure systems for forming silicone elastomers include peroxide cure systems that can crosslink through a reactive silicone site forming an Si—R—Si link between silicone chains.

Such systems are well known in the art, and any silicone that upon curing using such systems known or to be developed may be employed herein provided the curable material is able to exhibit Bingham plastic behavior during the additive manufacturing printing process. That is, the silicone must be flowable and the curing controlled through the speed, temperature and material properties to allow for the silicone to be flowable through the equipment to print layers in a timely manner before becoming too viscous to process. A Bingham plastic is a viscoplastic material that remains solid until a level of stress is applied and it becomes flowable as a viscous fluid. Such a material is an elastic solid at a shear stress, τ, that is less than a critical value, $\tau_0$. Once the shear stress exceeds the critical shear stress, also referred to in the art as the "yield stress," the material flows in such a way that the shear rate, ∂u/∂y, is directly proportional to the amount by which the applied shear stress exceeds the yield stress and the following equation applies:

$$\frac{\partial u}{\partial y} = \begin{cases} 0, & \tau < \tau_0 \\ (\tau - \tau_0)/\mu_\infty, & \tau \geq \tau_0 \end{cases}$$

If such properties are achievable by a curable silicone than such a silicone can be employed in an additive manufacturing method and also printed using the apparatus herein.

Preferably the silicone polymers used herein are one or more of polysiloxanes, polyalkylsiloxanes, polydialkylsiloxanes, polyarylsiloxanes, polyaralkylsiloxanes, and blends, alloys or copolymers of these materials with each other or with thermoplastic materials as described herein. Further, such thermoset silicon-containing polymers may have one or more hydrogen or one or silicon-bonded bonded group(s) on the silicon atoms in the main chain substituted with one or more groups, each of which substituted groups may further be functionalized or further substituted. Such substituted or functional groups may be branched and/or straight chain groups, including but not limited to hydroxyl, alkyl, alkenyl, alkynyl, aryl, alkoxy, alkenoxy, alkynoxy, aryloxy, arylalkyl, arylalkoxy, arylalkenoxy, vinyl, carboxyl, carbonyl, halogen, heterocyclic, and fluorinated or perfluorinated groups.

Compositions including silicone-containing polymers herein may include curatives, cure initiators, crosslinkers such as a hydrolytic crosslinker, cure catalysts such as an organic peroxide, and other cure system components as noted above and as are known in the art or to be developed. Additives and/or modifiers may further be incorporated into the composition including silicone containing polymer(s), such as, but not limited to, siloxane additives, ultra-high molecular weight siloxane additives, clarifiers, processing aids, stabilizers, colorants such as pigments and dyes, fillers, such as carbon black, quartz, pyrogenic silica, carbon nanotubes, glass fiber and optional coupling agents, aramid fiber, olefinic fibers, carbon fibers, UV absorbers, UV stabilizers, lubricants, such as waxes, fatty acids and other rheological additives, flame retardants, polyols, amides, fluoropolymers, fluorinated or perfluorinated polymer additives, nanosilica (i.e., nanosilicon dioxide) particles, polysiloxanes, antiblocking aids such as silica and talc, optical brighteners, dispersants, wetting agents, compatibilizers and any other suitable silicon-containing polymer additive and/or modifier known or to be developed for providing desired composition properties, provided such additive(s) do not block, prevent or substantially impede the ability to print the composition having a thermoset silicon-containing polymer by additive manufacturing.

Preferred additives for use in a thermoset silicon-containing polymer composition herein curatives such as peroxide curatives, typically incorporated in about 0.5 to about 5.5 parts per 100 parts of the silicone polymer, or in other systems a platinum catalyst in an amount of about 0.0005 to about 0.0015 parts per 100 parts of silicon-containing polymer. Other preferred additives include colorants and pigments such as white (titanium oxide), yellow (iron oxide or azo), blue (phthalocyanine GS or ultramarine), and/or green (phthalocyanine BS) in amounts that may vary but typically individually up to about 1.0 parts per hundred parts silicon-containing polymer or collectively up to about 1.5 parts per 100 parts silicon-containing polymer.

Such additives, other than any specific cure system, are optional and may be incorporated in amounts up to a total of about 50% by weight.

Depending on the cure system used, the degree of relevant curative may be adjusted for the system. As such cure systems are known in the art, the same systems may be used herein as noted above. Preferred examples of thermoset silicones for use within the invention include commercially available silicones such as DowSil®SE 1700, a two-part silicone with a platinum cure system, and Primetech®AMS silicone type 3302H, a one-part silicone with a peroxide cure system. Such systems may be used and combined as recommended by their manufacturers.

A thermoplastic composition herein includes at least one thermoplastic material(s) for use herein in one or more reinforcing layer may be any suitable thermoplastic capable of printing through additive manufacture, including but not limited to polyolefins including polyalkylenes such polypropylenes, polyethylenes, polybutylenes and polyethylene terephthalates, polyamides, polyesters, polyimides, polyarylene ethers, polystyrenes, polystyrene-butadiene, polyacrylonitriles, polyacrylonitrile-butadiene-styrene, polystyrene-acrylonitrile, polyphenylene sulfides, polyphenylene oxides, polyphenylene oxide blending with polystyrene, polyalkylene oxides and polyalkylene ethers, polyoxymethylenes, polyester polyols or polyalkylene polyols such as polyethylene terephthalate glycol, polyacrylates, polyalkylacrylates, polyvinyl acetates, polyvinylchorides, polyvinylidene chlorides, polyvinyl acetates, polyvinyl alcohols, polyacetals, polyvinyl ethers, polyvinylidene fluoride, melt-processible fluoropolymers (including FEP, PFA, ETFE), and polyarylene ethers, polyarylene ether ketones, polyarylene ether sulfones, and other aromatic polymers as described in co-pending U.S. patent application Ser. No. 16/568,125, thermoplastic elastomers (TPEs) and thermoplastic polyurethanes (TPUs). Suitable commercial thermoplastic polyurethanes include Ninjaflex® TPU, Cheetah® TPU, and Armadillo® TPU, each available from NinjaTek®. Suitable thermoplastic elastomers (TPEs) include Taulman® PCTPE (a plasticized copolyimide TPE), available from Taulman3D.com as well as polyether block amide (PEBAs) under the tradenames of Pebax®, available from Arkema or 3DXtech.com, and Vestamid® E, available from Evonik Industries. Fluorinated TPEs may also be used and are available from Solvay and Daikin Industries. Further, thermoplastic(s) as noted above, for use herein within a reinforcing layer, may include copolymers (made through random, block or graft polymerizations), alloys, blends and complex or cross-linked structures of these various thermoplastic materials, provided they are each capable of being processed through an additive manufacturing apparatus, and preferably also they are capable of providing reinforcement to a layer of a composition comprising a thermoset silicon-containing polymer as described above.

Such thermoplastic compositions may include one or more additives and/or modifiers, as are known in the art or to be developed for thermoplastic compositions, including clarifiers, processing aids, stabilizers, colorants such as pigments and dyes, fillers, such as carbon black, silica, quartz, pyrogenic silica, nanosilica particles, glass fibers and optional coupling agents, aramid fibers, carbon fibers, whiskers, carbon nanotubes, UV absorbers, UV stabilizers, lubricants, such as waxes, fatty acids and other rheological additives, flame retardants, polyols, amides, fluoropolymers in micropowder form, fluorinated or perfluorinated polymer additives, antiblocking aids such as silica and talc, optical brighteners, tensile modifiers, surface modifiers, slip agents, dispersants, wetting agents, adhesion promoters, antistatic agents, antimicrobial agents, desiccants and other suitable thermoplastic additives known or to be developed, provided such additives and/or modifiers do not block, prevent or substantially impede the ability to print the thermoplastic composition by additive manufacturing. Such additives are optional and may be incorporated in varying amounts depending on the intended end properties of the composition, provided the compositions are still printable in an additive printer apparatus.

In a method herein, the first composition including a first thermoset silicon-containing polymer is provided as is a thermoplastic composition which may be as described above. An at least partial layer of the first thermoset silicon-containing polymer is printed herein and in one embodiment herein, an at least partial layer of the thermoplastic composition is also printed. The layers are each preferably printed using an additive manufacturing device. As used herein, the term "layer" or "at least partial layer" include complete or partial deposition of a first thickness of a design layer in a computer design model (as the thickness may be set by the extruder nozzle tip or head) in an additive manufacturing apparatus, and may be a solid (complete) layer extending across the entire design width of the article in that particular layer, or only a partial layer. Partial layers are those that do not extend across the entire design width of the article, and may be, for example, a patterned layer that has a design, pattern or discontinuity across all or a portion of the design width of the article (which may or may not include more than one material), a partial layer of two different materials arranged within a single layer either in a patterned print as noted above or arranged so that the partial materials layers are in a juxtaposed side-by-side position with respect to each other over the entire design length or only a portion thereof.

As an example, a partial layer in a design pattern, e.g., a mesh design pattern or other design pattern or discontinuous layer may be incorporated as a reinforcing layer within the composite or a substantially complete layer may be formed as a reinforcing or other layer within the composite article. This enables localized layers of reinforcement points in an otherwise solid print layer and/or intermingling of multiple polymers printed independently as separately printed layers but that occur at the same level of z-direction depth in the article (e.g., a mesh design pattern layer of a thermoplastic polymer and a fill layer of a thermoset silicon-containing polymer that may fill the openings in the mesh and/or overlay the openings also with a substantially complete layer of thermoset silicon-containing polymer).

As another example, if printing a reinforced article of a circular cross-section, either a solid cylinder or tubular article with an opening extending therethrough, each printed layer may include more than one material of varying widths to form the circular shape. In the case of the tubular article, one or more gaps in printing in layers defining the opening would be left in printed layers that are partial layers, once a layer height is reached where the opening is to be defined that would include one or more of the materials, such as, for example, a partial layer print of the first thermoset silicon-containing polymer over a portion of the width of the article on outer portions of a layer, and, on inside portions of the width of such layer partial layer prints of a reinforcing composition including a thermoplastic material may be printed which are juxtaposed to the outer partial print layer leaving a central gap for defining the print of the opening. Thus a two layer composite with an opening may be printed by using complete layers and partial layers or leaving gaps to accommodate a design.

As used herein, when referring generally to the term "layer", one skilled in the art would thus understand based on this disclosure and the applicant herein intends that use of the term "layer" includes fully complete, partial, or patterned and partial layers and may include one or more materials within a given layer (i.e., a first thickness of a design layer having a given design width and length within a computer design model), unless the layer is otherwise expressly described to be a particular type of layer. The term "at least partial layer" is intended to be used interchangeably with "layer" but is intended to clarify that some portion of the layer includes a material being printed and that material may be printed over some, most or all of the layer depending on the design.

The first composition including the first thermoset silicon-containing polymer and the thermoplastic composition in the invention are thus printed in one embodiment herein so as to each form layers that are at least partial layers so that they may be printed successively or within the same layer as noted above. In one embodiment, the first composition including the first thermoset silicon-containing polymer is printed first, and may be printed on a substrate. A reinforcing layer, that may be at least a partial layer or a complete layer, including the thermoplastic composition may be printed on the layer of the first composition including the first thermoset silicon-containing polymer or, may be printed in the same layer if each is only a partial layer. Such layers may be printed as noted above, or may be reversed, such that the thermoplastic composition is printed as a first at least partial layer, and the thermoset silicon-containing polymer composition is printed on a layer of the thermoplastic composition or within the same layer (as a partial layer) as the thermoplastic composition. However, as the thermoplastic composition is intended in the composites herein as primarily a reinforcement layer, in preferred embodiments herein, it is preferred that the thermoset silicon-containing polymer composition is printed in a first layer and the reinforcing agent is printed on the first layer.

In one embodiment, multiple layers (complete or partial) of the thermoset silicon-containing polymer composition may be printed on or as a first layer (wherein a first layer may in this case include multiple layers) prior to printing one or more reinforcing layer(s) of the thermoplastic composition. It is also possible in another embodiment herein, to print a layer of the thermoset silicon-containing polymer composition, a reinforcing layer of the thermoplastic composition and then one or more additional layers of the thermoplastic composition on top of the reinforcing layer. Thus, in varying embodiments herein, a layer of the composition including a thermoset silicon-containing polymer and a reinforcing layer including the thermoplastic composition may be layered as noted, layered in reverse, layered successively and in an alternating manner, or layered in alternating layers the each include within them successive layers of a single composition. Each of such layered printed structures forms a composite printed article having at least one printed layer of the thermoset silicon-containing polymer composition and at least one reinforcing layer including the thermoplastic composition. Each such layer within such structures may also include partial layers as noted above and other materials printed within the same layer.

The resulting composite articles may be used as-is after additive manufacturing in a layer-by-layer process to form a composite article. Such three-dimensionally printed composite articles may be used as-is as a new part formed as an alternative to directly compression molded-articles, or may be further heat treated by annealing, oven treatment, compression molding or other forming process know for plastic articles in the composite arts for strengthening or for other processing.

In addition, the three-dimensionally printed composite articles formed by additive manufacturing may be further used as feed or forming materials, e.g., they may be printed into the form of blocks, spheres or the like and/or further pelletized or ground into smaller articles, and such feed or forming materials may be the basis of forming a further shaped article through other heat molding techniques, such as to form rods, rings, or other three-dimensional objects. Used three-dimensionally printed articles or articles formed therefrom may further be recycled using recycling techniques known or to be developed such as drawn into filament for further use in subsequent additive manufacturing methods or in heat molding processes.

In further embodiments herein, a second composition comprising a second thermoset silicon-containing polymer may be introduced into the composites herein. Such a second composition can be printed on the first composition including the first thermoset silicon-containing polymer or on the at least one reinforcing layer, and may also be printed within one of the other layers as a partial layer, such as in a juxtaposed or patterned configuration. The reinforcing layers may also be distinct or partial if desired. For example, at least one first silicone-containing composition layer(s) may be formed, at least one first reinforcing layer(s) having a first thermoplastic may be printed on the first silicone-containing composition layer(s). Between those layers, on top of them or within them in a partial or patterned manner, a second composition having a second silicone polymer may be optionally printed. Optionally, also a further reinforcing layer having a second thermoplastic material may be printed between or in any or all of the above-mentioned layers. In one embodiment, the one or more additional at least partial layer(s) of the second composition having a second thermoset silicon-containing polymer, as well as the at least partial layer(s) of the first silicon-containing composition and the at least partial layer(s) of the first thermoplastic, are printed in accordance with a design patterned.

In such embodiments having the second composition having a second thermoset silicon-containing polymer, the second composition having the second thermoset silicon-containing polymer may have the same or a different thermoset silicon-containing polymer than the first composition containing the first thermoset silicon-containing polymer. Thus, the compositions may vary by additives, blending or addition of other polymers within the printed layer using the same thermoset silicon-containing primary polymer, so long as both compositions are flowable using the characteristics of a Bingham plastic and are able to be printed using an additive manufacturing apparatus. Alternatively, two different thermoset silicon-containing polymers may be used in the first and second thermoset silicon-containing polymer compositions, in addition to which the additives and/or modifiers or other polymers, if any, in the compositions may also be the same base composition or may be varied.

Similarly, there may be more than one type of thermoplastic used in a thermoplastic composition and there may be more than one thermoplastic composition in different reinforcing layers. Such composites may be varied by layers and compositions, provided that at least one layer of a first composition having at least one first thermoset silicon-containing polymer and at least one reinforcing layer including at least one thermoplastic composition are incorporated into the composite printed, whether such layers are complete over the full design length or partial and/or whether layers include one or more materials within the same design layer.

Such further embodiments of the composite, as with the previous embodiments, may also be further processed post-printing or used in a printed article in the printed state. Further processing may include surface finishing, polishing, annealing or further heat-molding of the finished, printed three-dimensional article formed from the composites noted herein using an additive manufacturing apparatus. In such an apparatus, the composites are formed layer-by-layer using a computer design model as is known in the additive manufacturing art in which case, a three dimensional object and its pattern are pre-programmed into existing software installed on the three-dimensional printing apparatus or open source software designed for this purpose. However, as for such composites having multiple layers of different materials, for the multi-layer composites formed herein, a preferred apparatus has been further developed by applicants that be used having a capacity for multi-layer printing such that the composites may be made at a faster and more precise manner than with a standard additive manufacturing apparatus.

Figure 1:
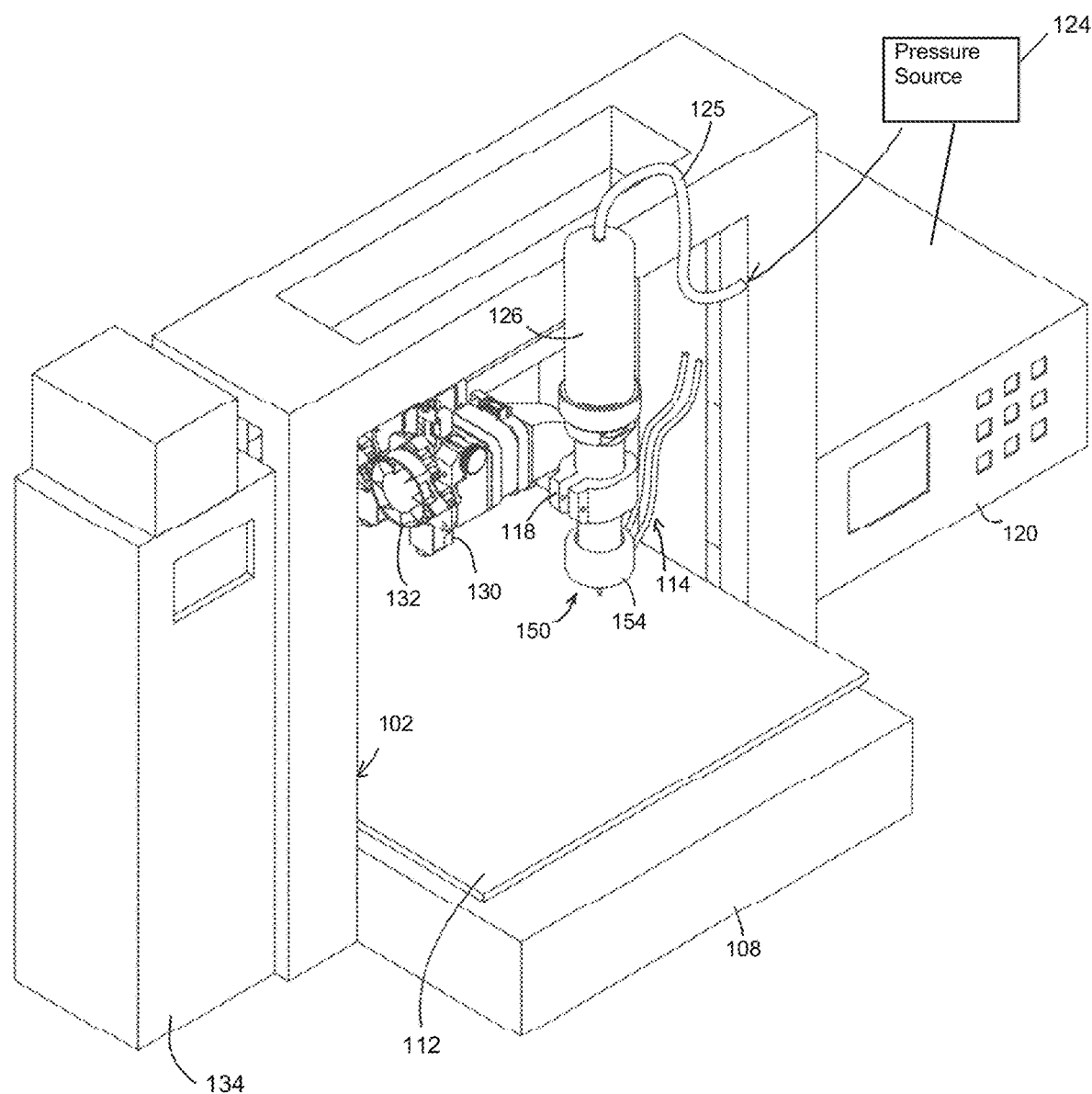
FIG. 1 is a front perspective schematic view of an apparatus for use in embodiments of the methods herein.
Figure 1A:
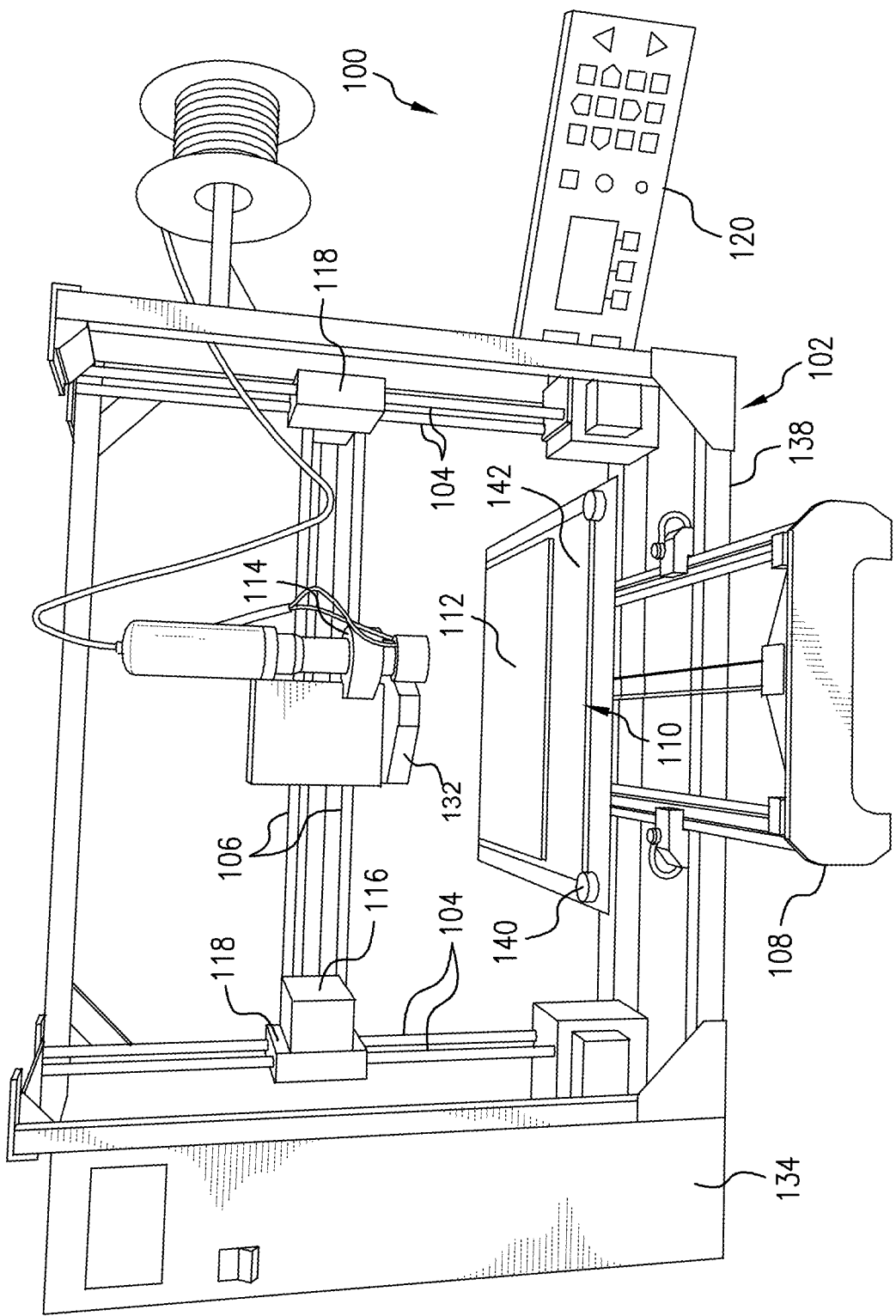
FIG. 1A is a front perspective view of the apparatus of FIG. 1.
Figure 3:
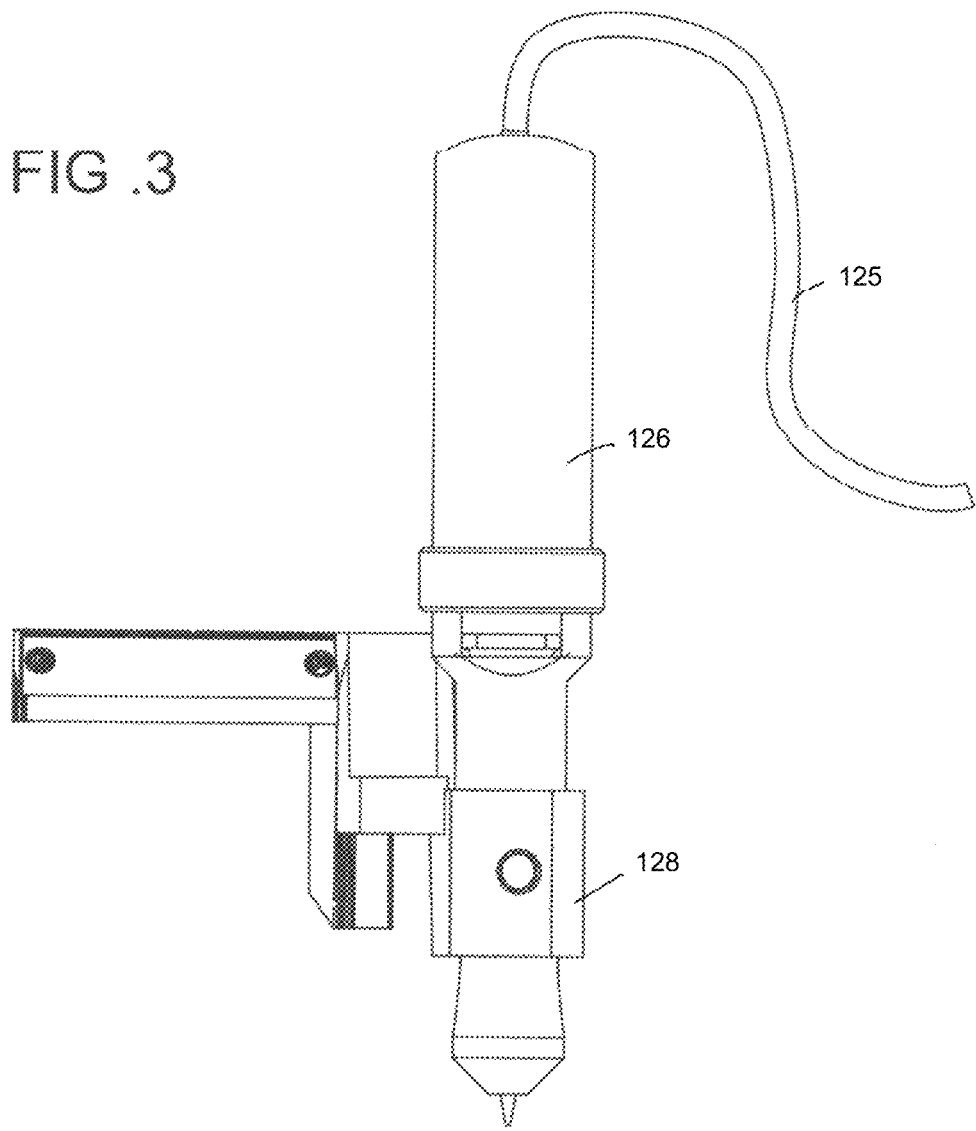
FIG. 3 is an enlarged front elevational view of the print nozzle and mounting arm of FIG. 2.
Figure 4:
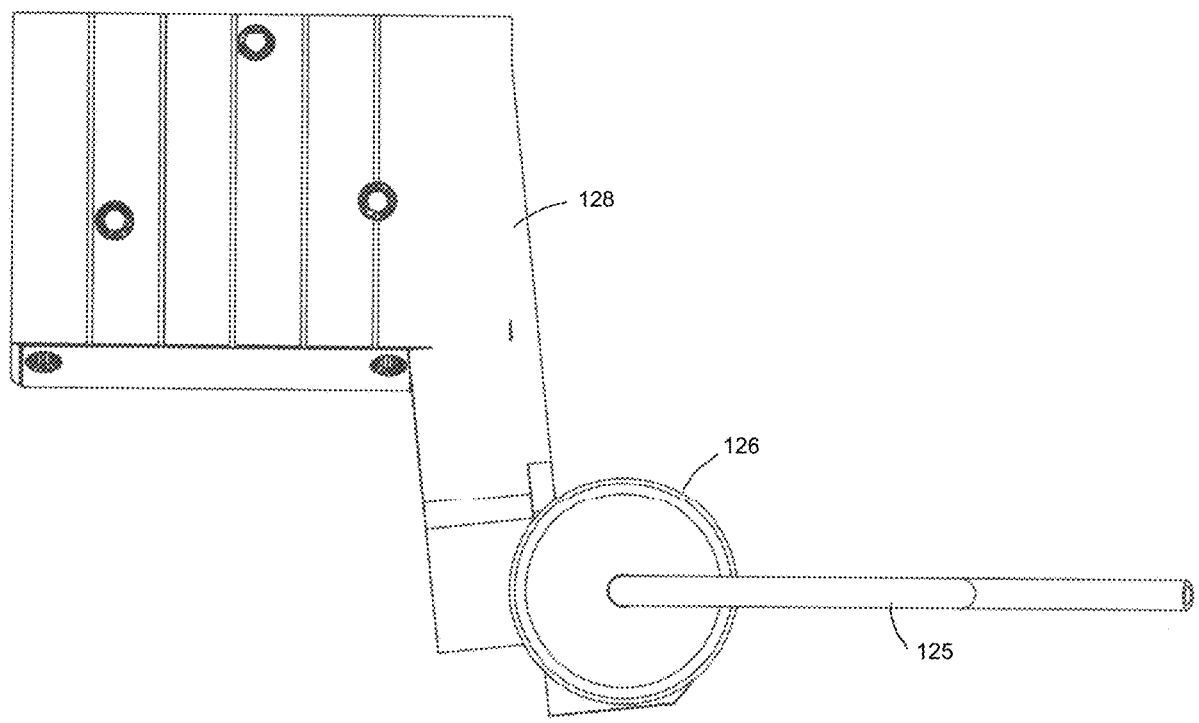
FIG. 4 is an enlarged top elevational view of the nozzle and mounting arm of FIG. 2.
Figure 5:
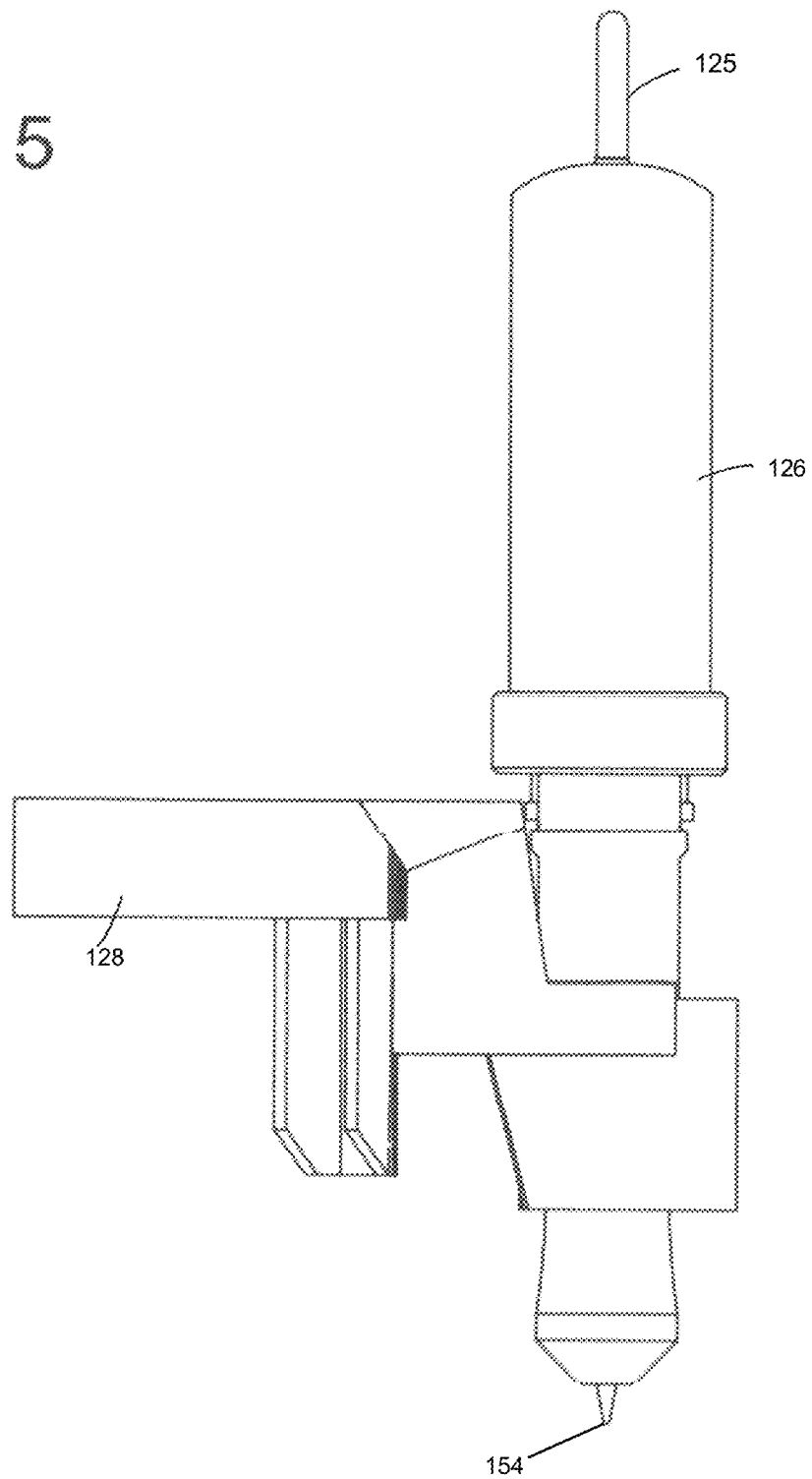
FIG. 5 is a right side elevational view of the nozzle and mounting arm of FIG. 2.
Figure 6:
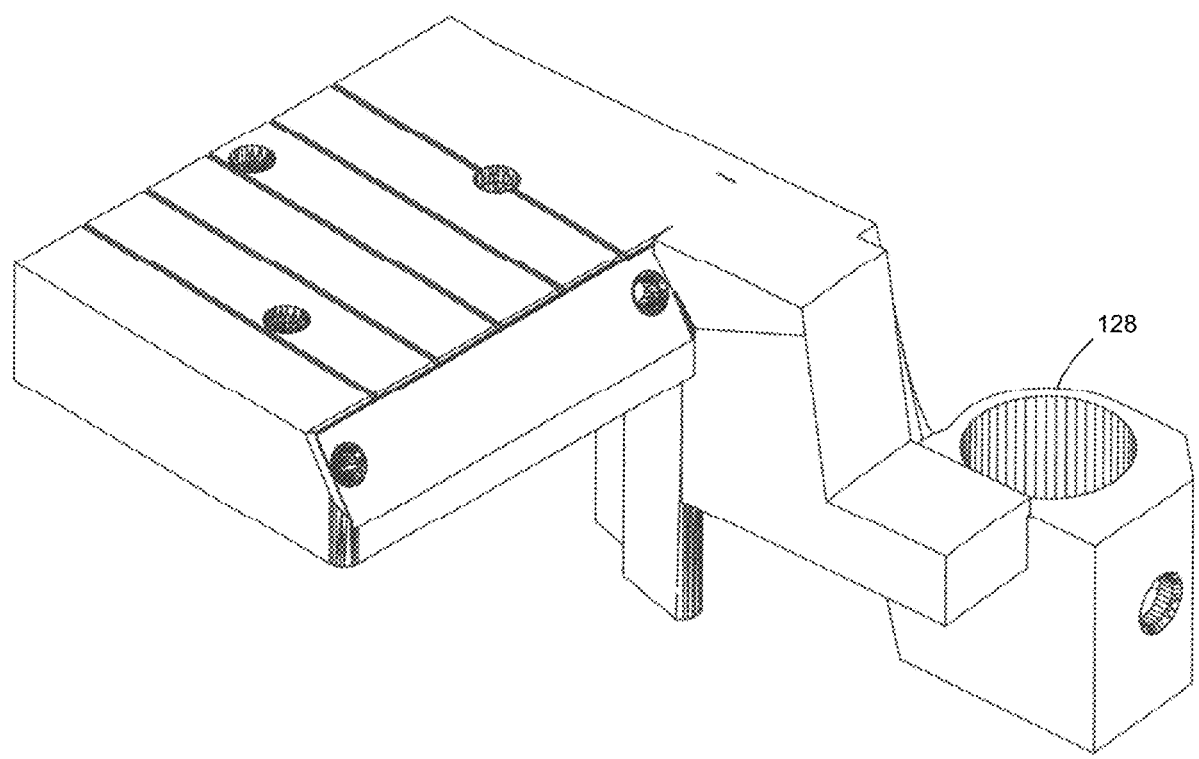
FIG. 6 is a front perspective view of the mounting arm of FIG. 2.
Figure 7:
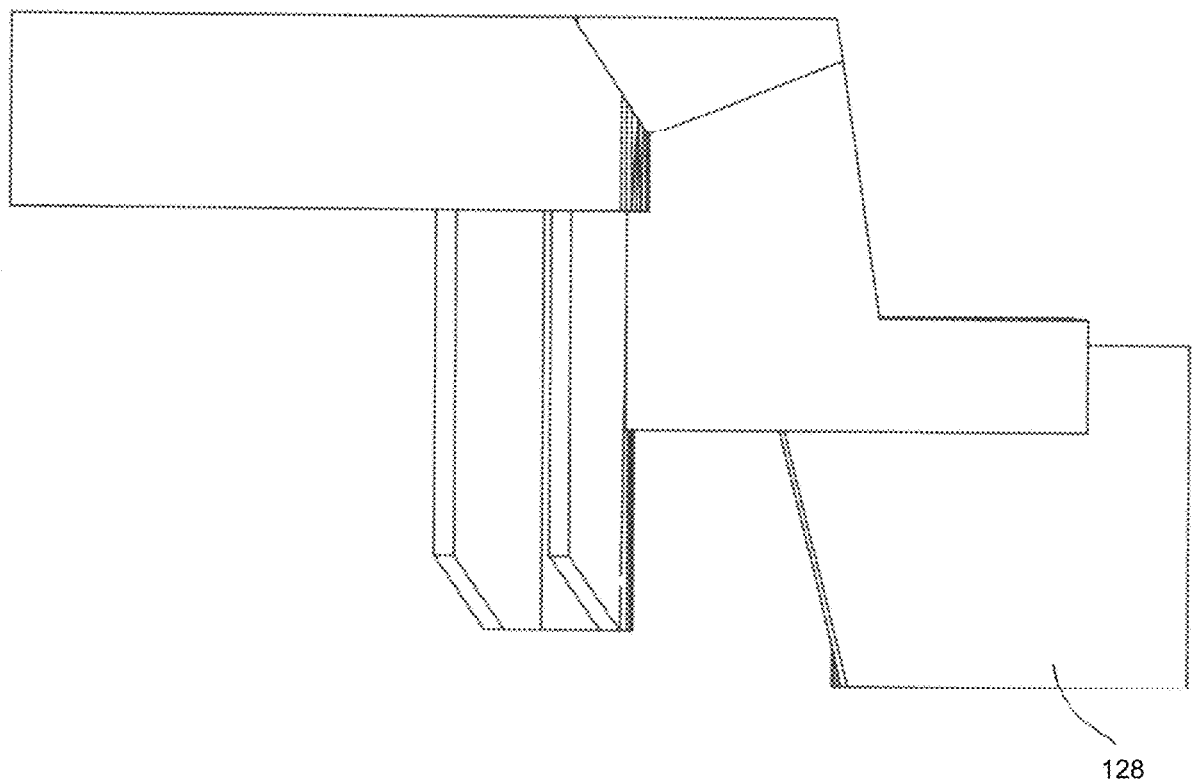
FIG. 7 is a right side elevational view of the mount arm of FIG. 6.
Figure 8:
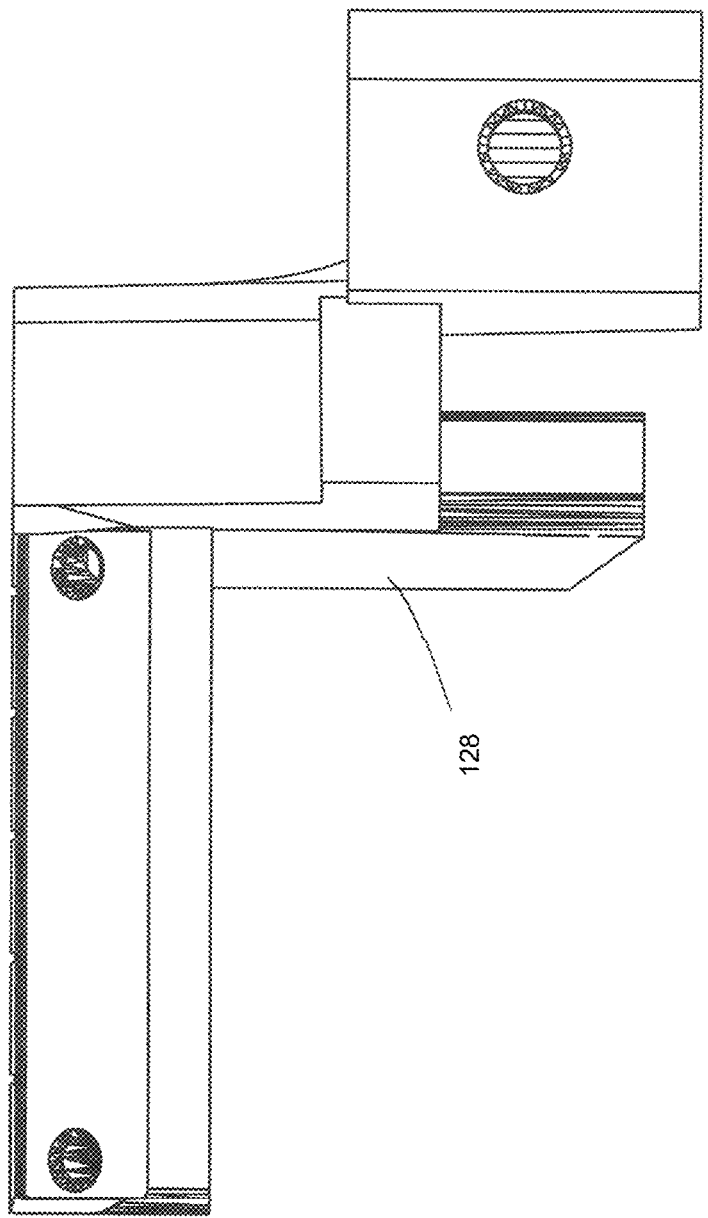
FIG. 8 is a front elevational view of the mounting arm of FIG. 6.
Figure 9:
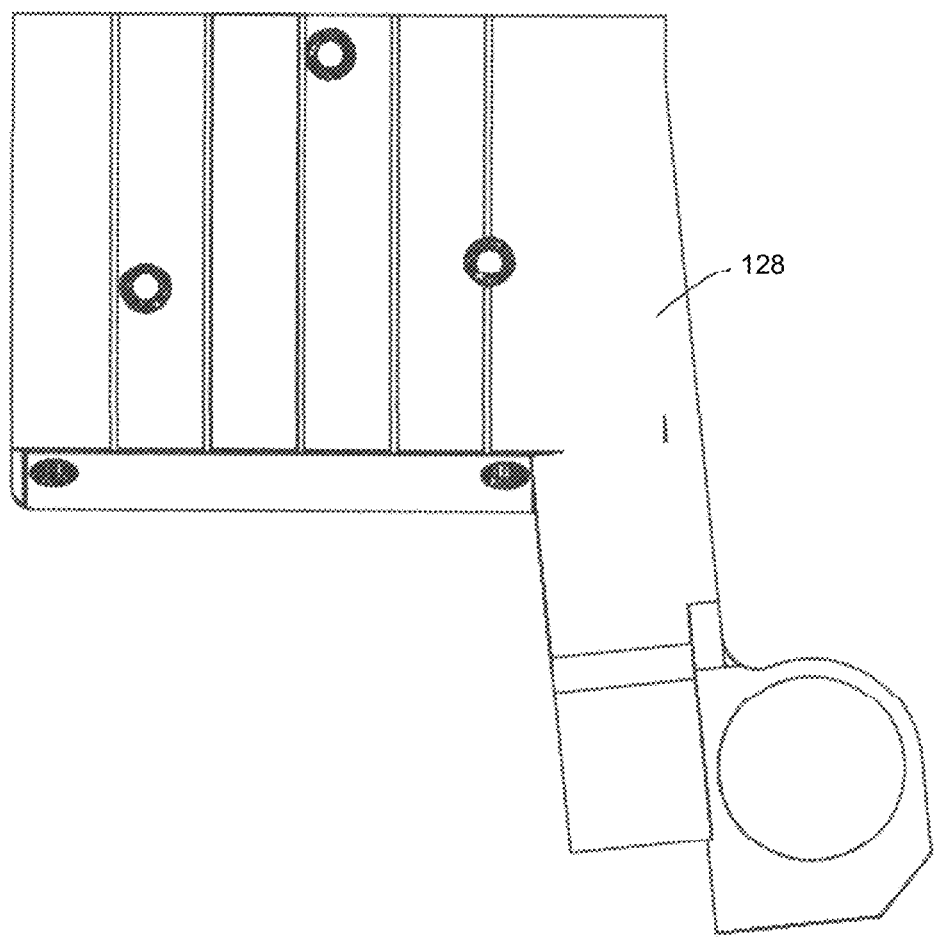
FIG. 9 is a top elevational view of the mounting arm of FIG. 6.
Figure 10:
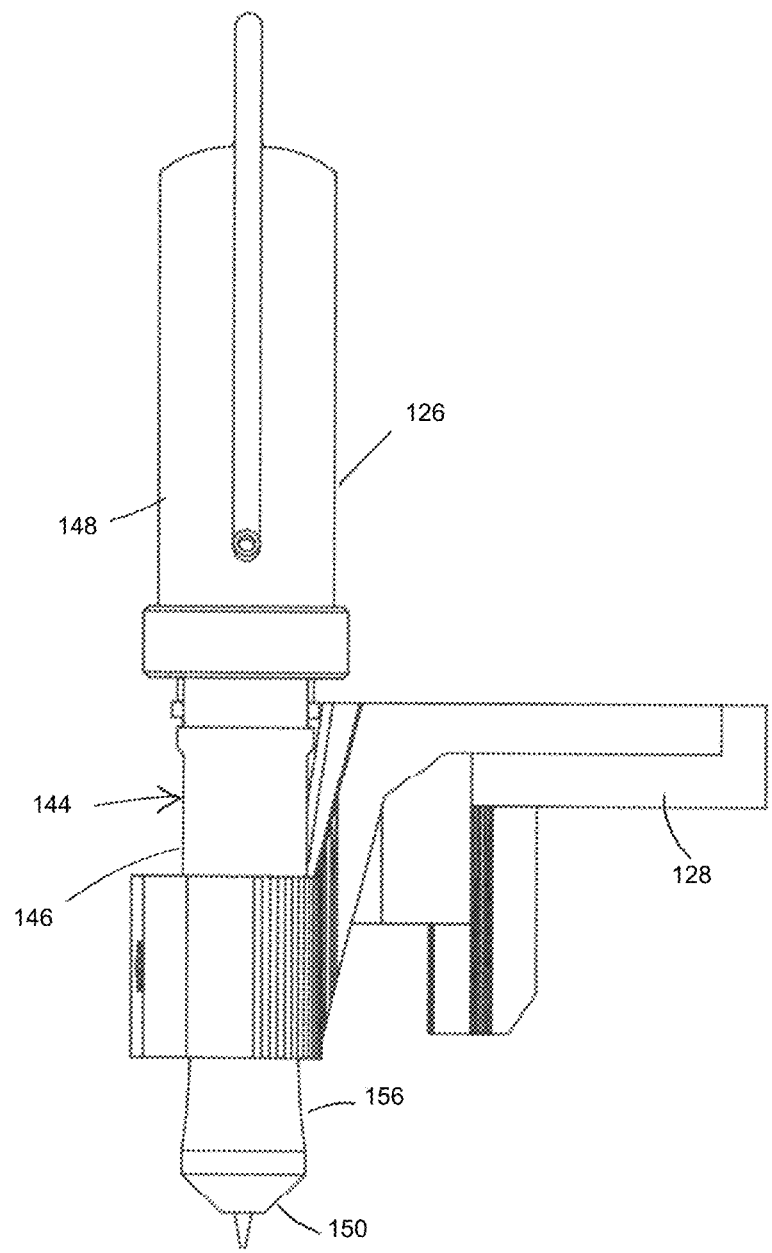
FIG. 10 is a left side elevational view of the print nozzle and mounting arm of FIG. 3.

FIGS. 1 and 1A show views of a preferred embodiment of an additive manufacturing apparatus 100. FIG. 1 provides a schematic representation of the apparatus, and FIG. 1A is a perspective view of an apparatus installed for formation of three-dimensional composite articles according to the present invention as described above.

As shown, a gantry assembly 102 having a plurality of longitudinal frame members 104 on either side of the assembly 102 and transversely extending frame members 106 for supporting a nozzle assembly 114 slidable along one or both of the transversely extending frame members 106. The frame member 106 are connected on either end to a slidable members 118 which are slidable supports mounted on the longitudinal frame members 104 on either side of the assembly. A drive motor 116 is positioned on one of the sliding members 118 (as shown it is on the left hand side) in operative communication with a programmable controller 120 and a printer drive mechanism 132 that operates the nozzle assembly 114 and with an additive manufacturing printer 134.

A base support frame 108 that may be movable and/or in slidable engagement with a lower gantry member 138 is provided. The support frame 108 includes a slidably engaged platform 110 that can support a substrate 112 for receiving a three dimensional printed article. The platform 110 includes mounting posts 140 for stabilizing the position of the central surface 142 that supports the substrate 112.

The arrangement of the overall three dimensional printer can be found in most additive manufacturing apparatus and as shown includes a Lulzbot Workhorse Edition printer. Other suitable commercial printers that have these features may also be used within the scope of the invention.

The nozzle assembly herein was developed by the applicants herein to function on a variety of commercially available three-dimensional printers in an additive manufacturing apparatus having a suitable sliding gantry such as that shown in FIG. 1A.

The nozzle assembly 114 includes a first nozzle 126 for printing a first composition including a thermoset silicon-containing polymer. The first nozzle 126 is preferably a pressurized nozzle and is in communication such as through tube 125 with a source of pressurization 124. The source of pressurization can be run through the controller 120 for adjustment of pressure while printing and pressurization may be provided by any acceptable pressurization source, such as pressurized gas, which may be pressurized air, or an inert gas such as nitrogen or another pressure source. The source of pressurization 124 can be a compressed cylinder or other in-line air or gas source. Preferably any such compressed air or gas source has a control valve and pressure relief valve as is known in the art.

The first nozzle 126 is mounted in a mounting arm 128 that is configured to support the first nozzle 126 while also extending away from the nozzle to support a second nozzle 130 situated proximate to the first nozzle 126, but independently and stably mounted to the mounting arm 128. Also situated on the mounting arm 128 is a printer drive mechanism 132 for operably introducing a thermoplastic polymer filament 123 into the second nozzle 130. The thermoplastic filament 123 may be introduced from a drive roller 122 and passes into the nozzle at a controlled speed by means of the printer drive mechanism 132.

Figure 11:
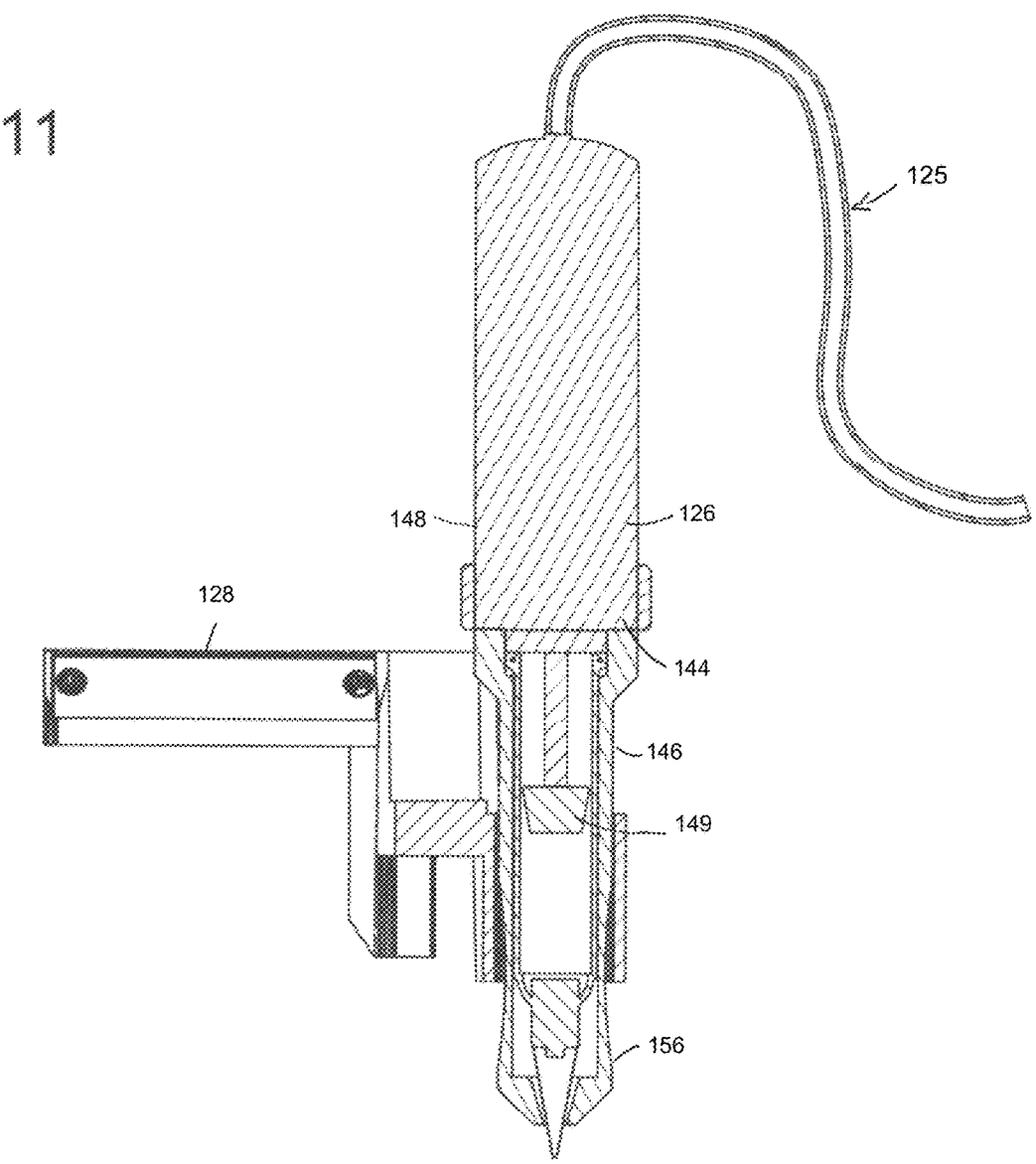
FIG. 11 is a longitudinal cross-sectional view of the print nozzle and mounting arm of FIG. 10 taken along line 11-11.
Figure 12:
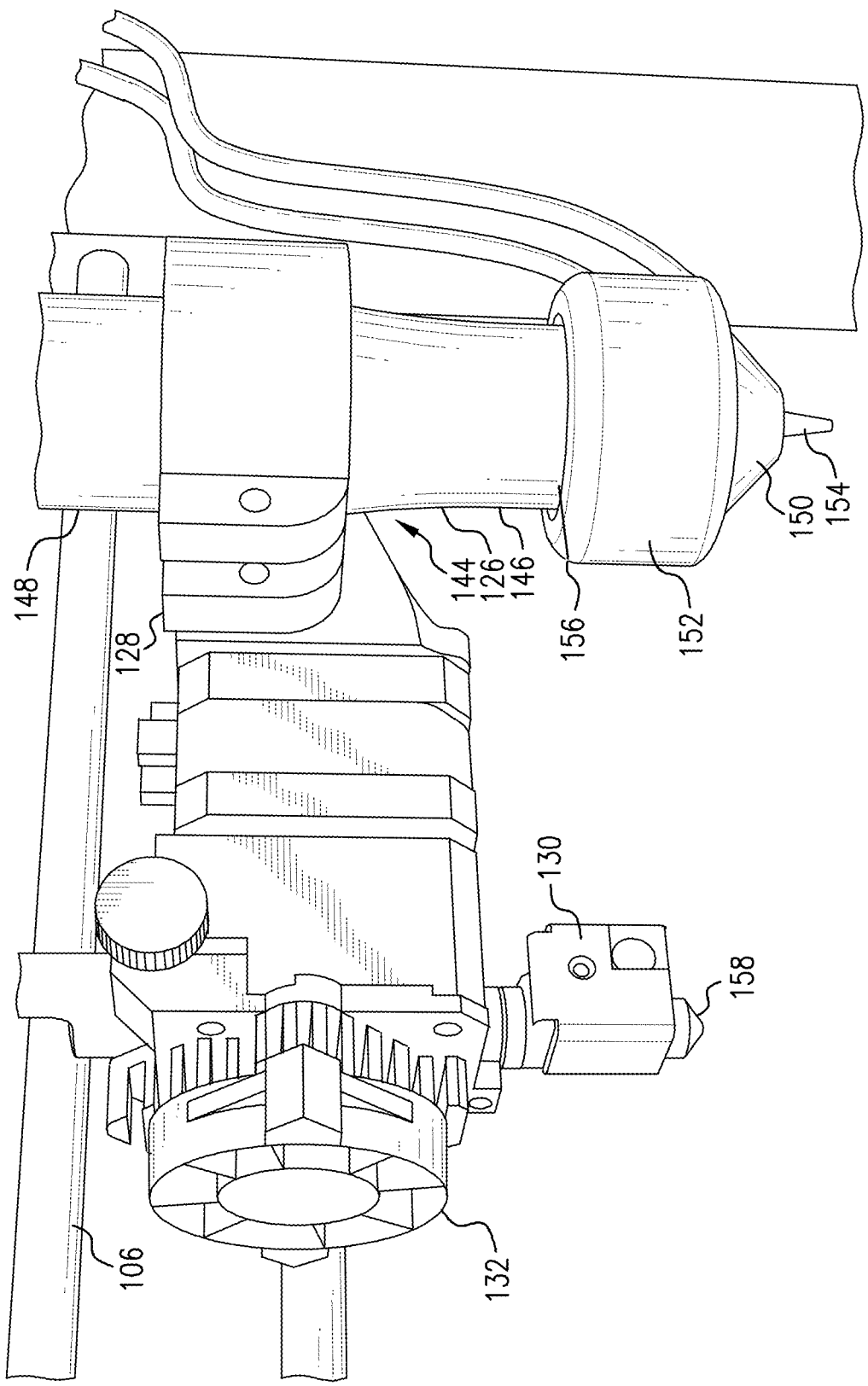
FIG. 12 is a front perspective view of a thermoplastic extruder head and a nozzle and mounting arm assembly for use in the apparatus of FIG. 1.
Figure 13:
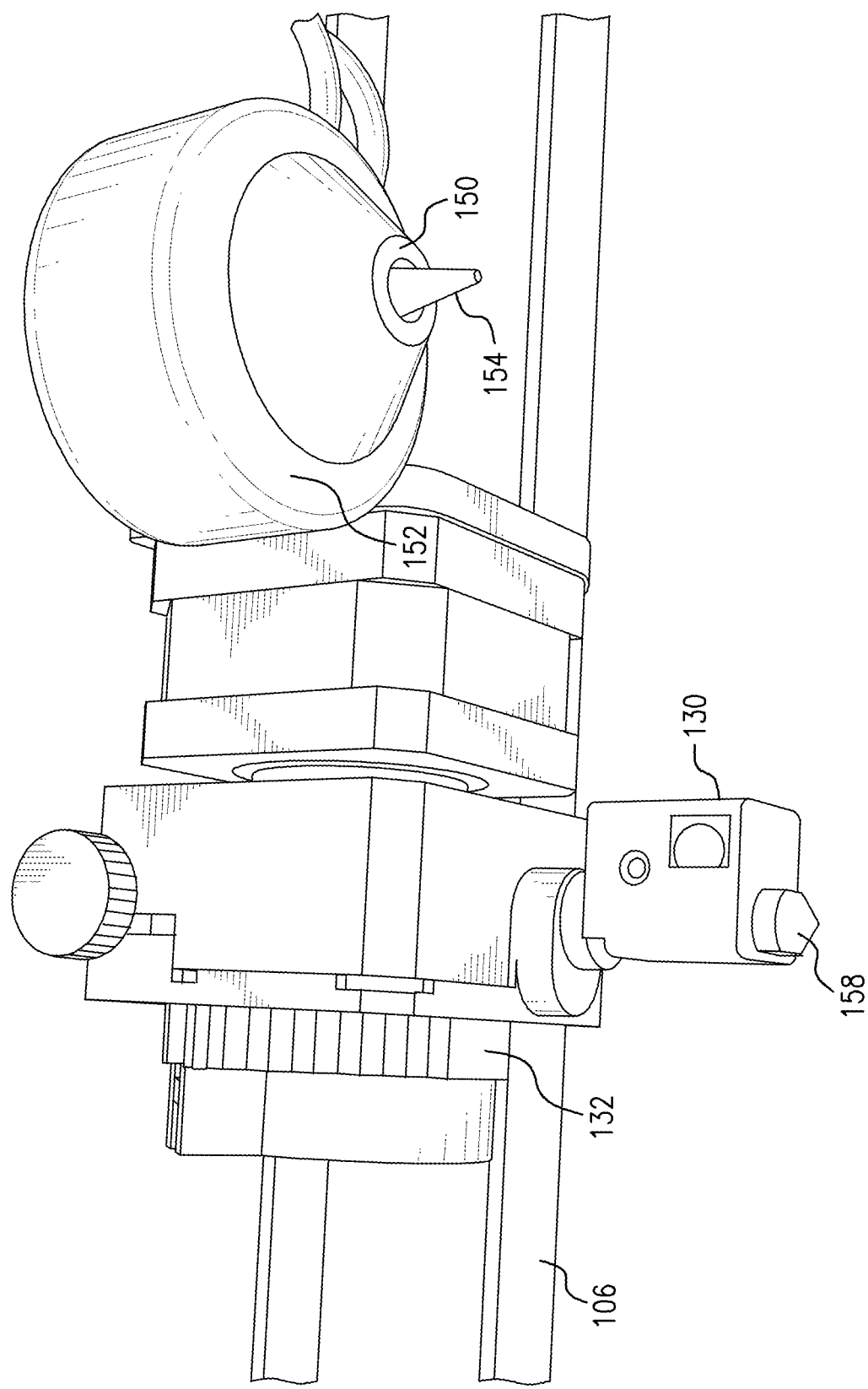
FIG. 13 is a bottom perspective view of the assembly of FIG. 12.
Figure 14:
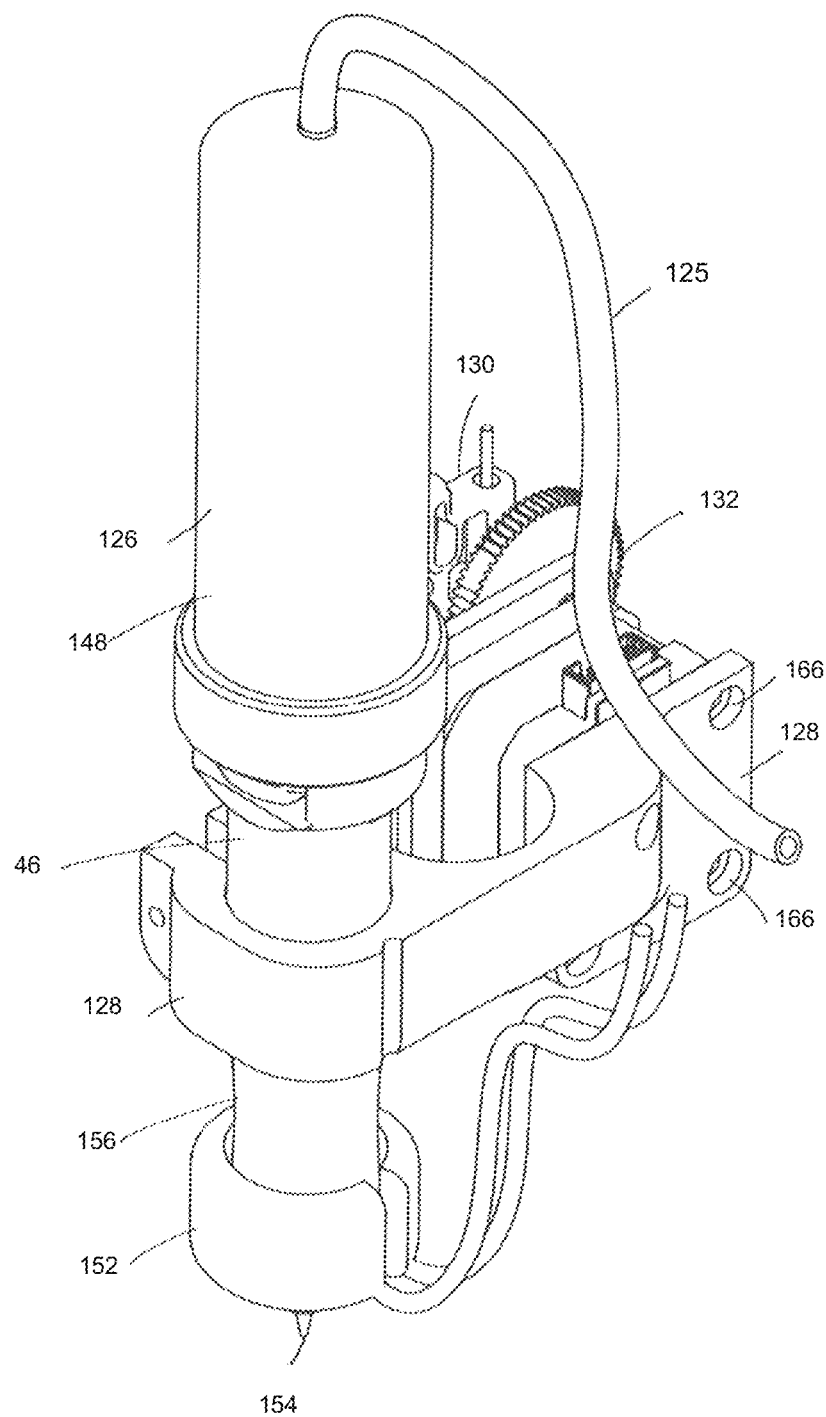
FIG. 14 is a rear perspective view of the assembly of FIG. 12.

The first nozzle as a pressurized nozzle may be operated such that the pressurization source 124 is operably connected to a high pressure extruder assembly 144 including as shown herein in FIGS. 1-5 and 10-14. The high pressure extruder assembly 144 may include a high pressure piston 148 which as shown in FIG. 11 includes an extending piston feature 149 to compress flowable material which is slidably operable within a syringe barrel 146 of the first nozzle 126. The outlet of the nozzle 150 may include a nozzle extruder tip 154 for controlling the width of the extruded thermoset silicon-containing polymer for printing. The extruder assembly is in communication with a heat source. As shown, a heated band or collar 152 may be positioned around the nozzle end 156 of the nozzle 126. The heated band 152 is preferably in operative communication with the controller 120 for controlling the temperature of the nozzle end 156 or hot end of the nozzle.

The second nozzle 130 may be any suitable additive manufacturing nozzle configured for printing a thermoplastic polymer through the nozzle opening 158 thereof. The second nozzle 130 is preferably also in operative communication with the controller for setting a suitable temperature for extruding the thermoplastic chosen and for setting a drive speed for the filament through the printer drive mechanism 132.

The controller is also preferably programmed by modifying the open source or commercial software available with the additive manufacturing device to have a computer design model that allows for alternative, successive or other mapping of different layers of polymer from one nozzle at a time.

As noted above, the first nozzle 126 may print a first at least partial or complete layer of an article, and the program may then engage a second nozzle 130 to print a full or partial layer on the first at least partial layer, and further layers, such as a third or further layers of either material may then be printed over the full or partial layer form the second nozzle 130 and so on according to a design pattern. The pattern, extent and width of a design layer and/or its thickness may be programmed into the computer design model to allow for use of the nozzles individually.

The mounting arm 128 as shown in FIGS. 1-14 is configured to have an extending support portion 160 that extends transversely from a support seat 162 configured to hold the pressurized first nozzle 126. The support seat 162 defines an opening 164 through which the lower nozzle portion 156 of the first nozzle may pass and beneath which the heated band 152 may be positioned. The extending support portion is configured to be sufficient to support the first nozzle 130 and the nozzle assembly 114 printer drive mechanism 132. The second nozzle 130 is shown as a heated extruder, such as a commercial extruder, Lulzbot Thermoplastic Extruder. Other similar commercial extruders capable of printing thermoplastics may also be used. The first nozzle 126 may be adapted as any suitable pressurized nozzle, and a suitable such nozzle is available commercially as a Nordson high pressure extruder.

The mounting arm may be mounted through fasteners extending through openings 166 on a rear portion thereof which may mount to transverse members 106 allowing for the nozzles to be moved side to side and lower and higher on the gantry assembly 102 of the apparatus 100. The base support frame may also be used for adjustment of the printing of the article.

Other robotic arms or gantry assemblies may be readily adapted to controllably position the dual mounted nozzles 126, 130. Further the mounting arm 128 may be extended transversely in rearward or forward direction to accommodate a third nozzle which may be the same as either of nozzles 126 or 130 as would be understood by one skilled in the art based on this disclosure within the scope of the invention by extending either the support portion 160 or forming a second pressurized nozzle seat such as support seat 162 on the mounting arm. It is also within the scope of the invention that a second nozzle assembly including a second mounting arm identical to that shown is controllably mounted on the same transverse members or on independently suspended and slidably operative transverse arms of the gantry assembly. Such a second nozzle assembly can enable a second composition containing a silicon polymer or a second thermoplastic polymer to be printed in the same configuration and in the same composite matrix if desired, provided that the computer design model is modified to accommodate such printing.

It is further understood that it is within the scope of the apparatus as shown that the filament fed to the second nozzle may be changed in between layers to a second thermoplastic composition and the thermoset silicon-containing polymer composition in the first nozzle may be changed to a second thermoset silicon-containing polymer composition in the same nozzle to also accommodate printing more than two compositions in the same composite structure.

EXAMPLES

Example 1: Printing Method

Figure 15:
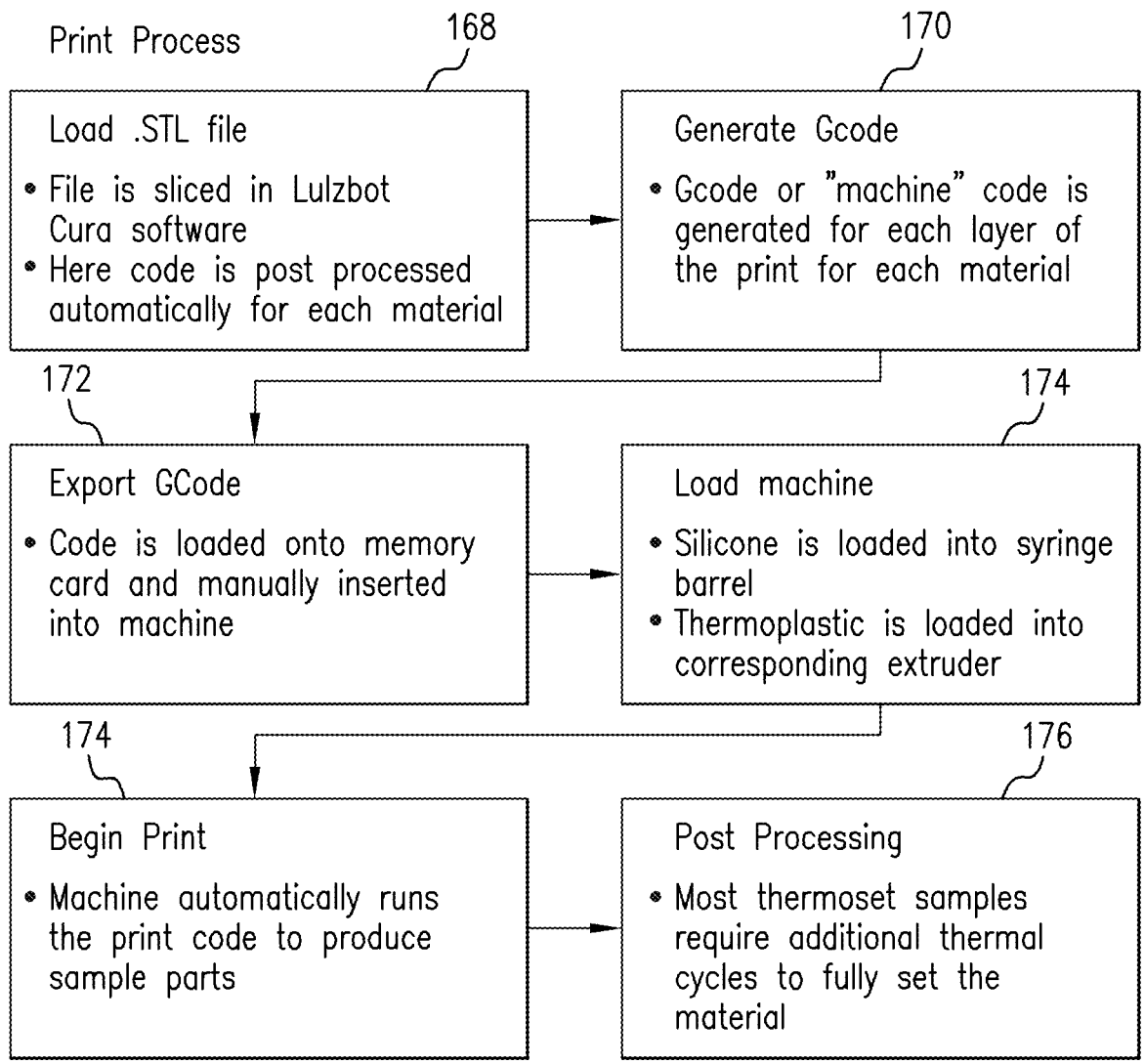
FIG. 15 is a process flow diagram for additive printing using the apparatus of FIG. 1.

With reference to FIG. 15, a basic printing method is outlined that was adapted for use in the Examples herein. In a first printing step 168 involved slicing the file in Lulzbot Cura software for use with a Lulzbot additive manufacturing printer adapted to have preferred features as noted above, including a first nozzle for printing a thermoset silicon-containing polymer composition and a second nozzle for printing a thermoplastic composition reinforcing layer, each mounted on a mounting arm as described further below. The slicing involved a custom design model that took into account the offset of the two nozzle extruders which was calculated and the settings input into the slicing software using slicing techniques known to those of ordinary skill in the art. The code was post-processed for each material. In a second step 170, a GCode (machine code) was generated for each layer of the print for each of two compositions being printed to form a composite article.

In a further step 172, the GCode was loaded onto a memory card and inserted into the additive manufacturing apparatus.

A silicone composition was prepared for printing using DowSil™ SE 1700 with a platinum catalyst curable silicone. A first two-part thermoset DowSil™ SE 1700 silicon was prepared as follows. In a 500 ml plastic jar, 136.4 g of Part A DowSil™ SE 1700 (10 parts) and 13.6 g of Part B (1 part) DowSil™ SE 1700 were added. The combined parts A and B mixture were thoroughly mixed until uniform appearance was achieved to avoid an incomplete cure. The uniformity was checked by the absence of light-colored streaks or marbling after thorough mixing. After verifying the uniformity of the mixture, it was de-aired in a vacuum oven using 28-30 in. Hg vacuum at room temperature to remove air bubbles. Then the mixtures was used for additive printing as described below as the silicone composition.

In a step 174, a silicone composition as noted above was loaded into the syringe barrel of a high-pressure dispensing tool by Nordson EFD mounted in a nozzle assembly according to the present invention, and a thermoplastic polyamide, nylon, sold as Lulzbot Taulman 618 Nylon, at 3 mm diameter (white) was loaded into a Lulzbot extruder mounted on the mounting arm of the nozzle assembly. As the filament absorbs water, the plastic is periodically run through drying cycles at 110° C. The dispensing tips for the Nordson extruder were metallic tips with PTFE lining which provide a smooth surface and allow material to flow readily through the nozzle. A heating band as described above was attached to the Nordson nozzle extruder and a sensor was provided to control the temperature, which is preferably set at about 80° C. to about ° 100C. for high viscosity silicones. The pressure fed to the piston mechanism of the Nordson nozzle was controlled by the Ultimus V Precision Dispenser which was in operable communication with and wired to the main controller's board on the Lulzbot Workhorse 3D printer apparatus.

The nozzle assembly allowed the two extruders to move in tandem. The mounting arm was designed to minimize the amount of movement of the nozzles from vibration as well as to ensure the equipment cleared all parts of the additive manufacturing printer on which the nozzle assembly including the mounting arm was installed. The mounting arm used was as shown in the drawings herein.

The Nordson piston extruder is rated to produce up to 400 psi of extrusion force. The additive manufacturing device (a Lulzbot Workhorse Edition printer) was operated to print with the controller and code allowing for the automatic printing of composite sample parts formed incorporating both materials. The printer used is a fused filament fabrication (FFF) 3D printer by Aleph Objects. The printer was chosen for its large build volume and integrated calibration system.

The printer controller was able to turn the pressure and flow of material on and off by changing the state of the FAN_0. This allows the printer apparatus to print both materials from the two separate nozzles without human interaction. This implementation was directly integrated into the slicing software so that code generation was done automatically. The Cura slicing software was initially developed by Ultimaker and modified by Aleph Objects to work with the Lulzbot line of additive manufacturing printers. The Lulzbot Cura was the main slicing software used herein to prepare the composite parts made.

An optional step 176 is optionally employed for thermoset silicone which may require additional thermal cycles (such as post-cure or annealing) to fully set the material.

The same procedure was also carried out using a thermoset AMS 3302H silicone that is peroxide curable. The silicone was prepared and in a 10 mL high-pressure Nordson dispensing syringe, 8 g of Primetech AMS 3302H was loaded and compressed by hand to expel most of the air pockets. The syringe was then placed into the high pressure Nordson syringe booster. The syringe band heater was slowly heated to the desired temperature for silicone extrusion (80-110° C.), and the printing was commenced with the temperature and flow of the silicone reached a steady state.

Example 2: Silicone and Thermoplastic Fiber Composite Materials

Figure 20:
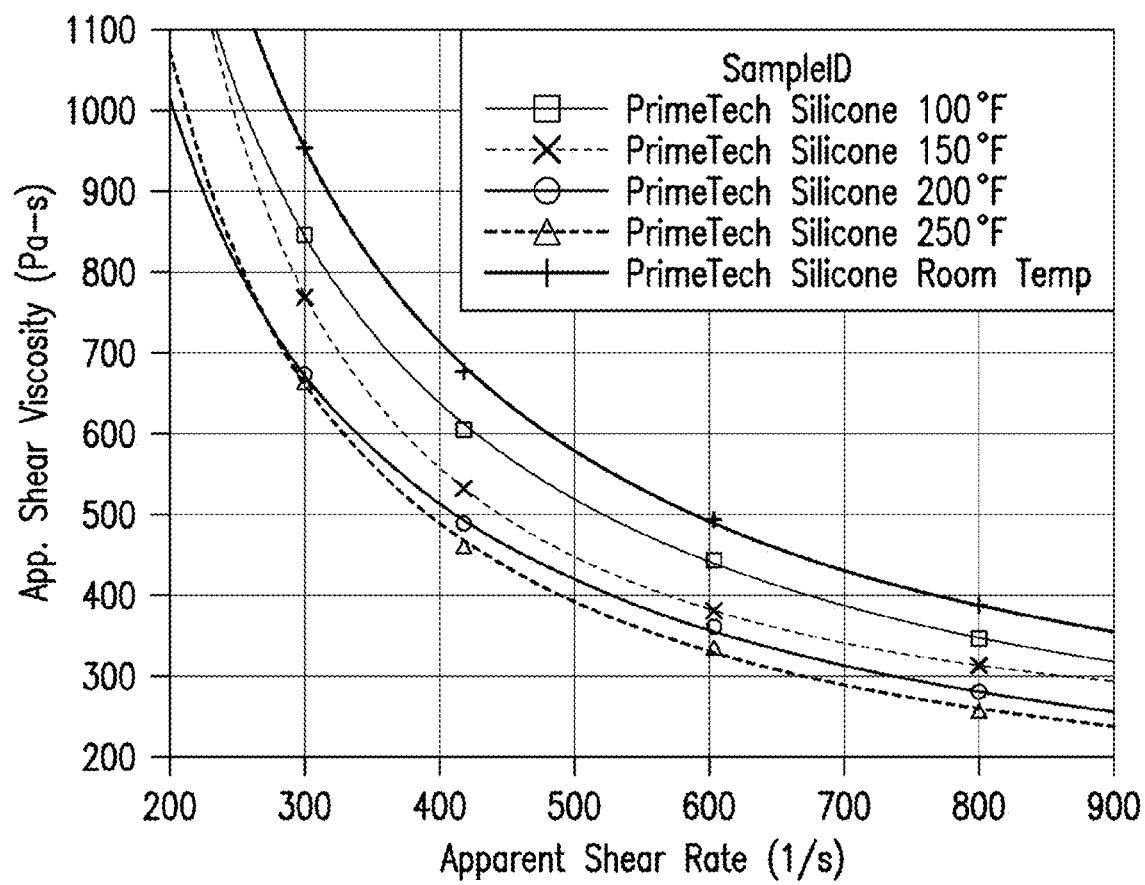
FIG. 20 is a graphical representation of capillary rheometer data the relationship between apparent shear viscosity (in Pa-s) against the apparent shear rate (1/s) of a silicone polymer used in the Examples herein at varying temperatures to evaluate the viscosity range for evaluating the material for printing.

To evaluate suitable curable thermoset silicon-containing polymers for forming silicones for use in the present invention, several commercial silicone material were evaluated based on their rheological properties including their apparent shear viscosity (in Pa-s) and apparent shear rate (/s) at varying temperatures. Initial tests using as an example, PrimeTech AMS3302H commercially available silicone at 100° F., 150° F., 200° F., 250° F. and at room temperature provided capillary rheometer data as shown, e.g., in FIG. 20 and were also evaluated using moving die rheometer data. This allowed for identification of a suitable temperature range and shear rate to achieve a desired viscosity range for printing of that material. Similar tests may be run for varying silicones to select operating parameters for printing.

Using those parameters and the process noted above in Example 1, a sample composite article in the form of a reinforced elastomeric tube was formed including a silicone layers and a polyethylene terephthalate reinforcing layer. The article is shown in FIG. 21. The article was analyzed using SEM imaging and the scans are shown in FIG. 21A. The layer thicknesses were measured each at four points and the average layer thicknesses are provided below in Table 1.

TABLE 1

| Layer | Material | Average Thickness (mm) |
|---|---|---|
| 1 | silicone | 0.71 |
| 2 | fiber | 0.21 |
| 3 | silicone | 0.32 |
| 4 | fiber | 0.17 |

A test developed by applicant for measuring interlayer adhesion was employed to test the sample material and a test machine is shown in schematic form in FIG. 22 and perspective view of the machine is shown in FIG. 22A. In the test, a four-layer composite was printed as noted above, as a flat layer composite and the sample cut on one end to separate layers 1 and 2 from layers 3 and 4. A fixed lower seat stably holds layers 3 and 4 while a moving jaw lifts and is pulled by a machine applying a 1 kN load cell. The grip separation is 3 inches and the test rate is 10 in/min. The test specimen was placed in the grips so that there was minimum tension on the specimen. The test started and the grips were separated at a rate of 10 in/min until the specimen began to peel apart. The maximum load was recorded and the load was plotted against the extension.

Other tests that may be used to evaluate the samples include an Instron pull test using a Type A tensile bar according to ASTM D412.

Photographic representations of complex three dimensional printed composite articles formed using nylon 6,6 as a reinforcing material with silicone include O-rings and gaskets as shown photographically in FIG. 24A and formed using nylon 6,6 and silicone layer.

Example 3: Additive Manufacturing Printed Composites of Silicone with a Nylon 6,6 Reinforcing Design Layer FIGS. 23A and 23B show silicone layers printed on varying thermoplastic nylon 6,6 structures printed according to a design pattern. In this particular example, the design pattern provided a mesh design. In FIG. 23A, a 0-20-340 mesh was printed as a reinforcing layer and in FIG. 23B, a triangle mesh was printed. Three layer structures with two silicone layers surrounding the mesh design layer are shown, and were printed and compared to a three layer composite formed by compression molding silicone layers and a polyethylene terephthalate reinforcing layer. A further test was run to compare the three layer structure with the four layer structure formed with the same materials but as described above in Example 2. The results are shown below in Table 2.

TABLE 2

| Sample | Young's Modulus (MPa) | Ultimate Tensile Strength (MPa) |
| --- | --- | --- |
| Compression Molded 3-layer | 7.2 | 4.1 |
| 0-20-340 Mesh 3-layer | 3.4 | 27.4 |
| Triangle Mesh 3-layer | 1.4 | 1.5 |
| Reinforced Elastomeric Multilayer Tube of Ex. 2 | 39.3 | 11.3 |

Various composite parts were prepared using the nozzle assembly and apparatus herein and using a silicone polymer and mesh reinforcement layer. FIG. 16 shows a Nittany Lion Penn State logo pattern composite using a layer of nylon mesh under a layer of silicone and each was consistent to form the complex shaped article.

FIG. 17 shows a composite printing in process with a layer of silicone having a nylon 6.6 mesh reinforcement layer, with a partial silicone layer printed on top of the mesh layer.

FIG. 18 shows a finished square composite print with a nylon 6,6 mesh layer printed mesh layer visible through silicone layers.

FIG. 19 shows an interface of silicone and acrylonitrile-butadiene-styrene (ABS) in a part in which the silicone print can be seen as white as well as the black print of ABS.

In each of the composite articles printed, a polytetrafluoroethylene covered steel-based baking sheets. The non-stick surface was used to ensure silicone-based composites made could be cleanly removed after thermal cycling and the steel enabled the surface to withstand the thermal cycles without melting. When new tips were provided, a calibration was carried out to determine the settings that would work best for printing speed and resolution desired. Travel speed for the high pressure extruder nozzle is directly related to the length of the material extruded out of the nozzle tip per time interval (i.e., mm/s). Layer height was adjusted to be 10% less than the inner diameter of the nozzle opening so that the layers had the opportunity to merge together. These settings can be incorporated into the slicing software.

Example 4: Tubular Structure Three-Dimensional Additive Printing Using Thermoset Silicone and Thermoplastic Reinforcement This Example was prepared to describe the workflow and machine process for the additive printing of a silicone (in this case a Primetech AMS3302H silicone) and a thermoplastic reinforcement using as an example a thermoplastic polyurethane (TPU) in a tubular structure (i.e., in a structure containing both complete and partial layers to define an opening therethrough). The tube design used was made in accordance with development of multi-material tube shapes within a requested design envelope.

Tube shapes are modeled in a variety of computer aided design (CAD) software, such as AutoCAD® or AutoCAD® LT software, as well as SolidWorks® by Dessault Systems and Fusion 360® by Autodesk. FIG. 25 herein shows a screen capture of a three dimensional model from SolidWorks®.

Once a series of three-dimensional models is completed in the CAD software package, the shapes are exported to a .STL file format. Such .STL file format is known as a surface tessellation language that simplifies the complex mathematical curvatures of the three-dimensional model into flat triangular shapes to reduce the complexity and computational power needed to perform the tool path design for three-dimensional printing. For multi-material printing, it is known to export the differing material shapes as separate .STL files to be designated in the print set-up software.

FIG. 26 is an Internet (Wikipedia) example of an .STL format file showing he differences between a curved model identified as CM and an exported .STL model identified as ES.

After the .STL models are ready, the printing plater and parameters are set up. The software used in this Example was Cura™ LulzBot™ edition 3.5.20. Cura™ (by Ultimaker) is an open-source universal print set up interface. The base printer (from Aleph Objects) used was provided also with a complimentary software print set up version of Cura™. This is the LulzBot™ edition of Cura™.

In this software, the .STL files are arranged in the digital build volume, given a specific nozzle to be printed with, and parameters are set for the process. The parameters vary based on the shape and the materials to be used. Some parameters including speed, extrusion temperature, and layer height. In Cura™, there are over 100 parameters that may be used to control the toolpath, i.e., the motion and direction, of the printer. FIG. 27 shows an example of a Cura™ LulzBot™ 3.6.20 interface.

When all parameters were set, the STL model was "sliced," meaning the internal calculations were done to convert a three-dimensional STL model int a series of two-dimensional layers that are stacked to represent the three-dimensional model for printing. These two-dimensional layers are parsed into line-by-line coordinate machine code, known as G-Code. This code serves as the instructions directing motors to turn to specific angles at specific times to mode the nozzles around in three-dimensional space. The machine is able to extrude enough material out of both nozzles to product a close representation of the three-dimensional model using thousands of precise moves. FIG. 28 includes an example of a few lines of G-Code.

The combination of a three-dimensional model, printing parameters, and well-tuned hardware reliably produces desired shapes. For the tube shape shown in FIG. 25, the part was printed with two .STL files that were nested inside each other on the build plate. As the nozzles deposit material at independent speeds, temperatures and shapes, each layer may include silicone, thermoplastic or combinations of both of these materials (including leaving gaps where needed). The materials are isolated in the roads or beads of material as extruded.

When the G-Code is loaded in the machine, the printer follows the steps of:
(1) begin reading the model-specific G-Code file;
(2) heat-up thermoplastics printing nozzle and optionally, the build plate;
(3) move to home position to locate the origin reference point;
(4) start print code:
　(a) extrude the thermoplastic (if any). In this example, a thermoplastic polyurethane was used;
　(b) move the silicone extruder with nozzle to center;
　(c) extrude silicone (via signal from printer to pressure regulator);
　(d) move up to the next layer;
　(e) extrude silicone;
　(f) move the extruder with nozzle for the thermoplastic (TPU) to center;
　(g) extrude the thermoplastic (TPU);
　(h) move up to the next layer; and
　(i) repeat from (4)(a) until print is complete
(5) return to home position;
(6) cool down heated elements; and
(7) End G-Code After printing, the multi-material print was subjected to a curing cycle at 185° C. for two hours to fully cure the specific silicone used (noted above) and to attain the desired tubular structure.

FIGS. 29 and 30 show, respectively a top plan view and a perspective view of a tubular item printed using the above-noted procedure having an internal shell of reinforcing TPU (red) and an exterior shell of silicone (white) according to the programmed shape in FIG. 25.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for forming composite articles comprising thermoset silicon-containing polymers, comprising:
　(a) providing a first composition comprising a first thermoset silicon-containing polymer;
　(b) providing a thermoplastic composition;
　(c) printing, using an additive manufacturing device:
　　(i) a first at least partial layer of the first composition comprising the first thermoset silicon-containing polymer using an additive manufacturing device; and
　　(ii) an at least partial reinforcing layer comprising the thermoplastic composition, wherein the first at least partial layer of the first composition comprising the first thermoset silicon-containing polymer and the at least partial reinforcing layer are printed either to be within the same layer or in successive layers.

2. The method according to claim 1, wherein the first at least partial layer of the first composition comprising the first thermoset silicon-containing polymer is printed on a substrate.

3. The method according to claim 1, wherein the first at least partial layer of the first composition comprising the first thermoset silicon-containing polymer and the at least partial reinforcing layer are complete individual layers printed in at least two successive layers.

4. The method according to claim 3, wherein the first at least partial layer of the first composition comprising the first thermoset silicon-containing polymer is printed on a substrate.

5. The method according to claim 1, wherein the first at least partial layer of the first composition comprising the first thermoset silicon-containing polymer and the at least partial reinforcing layer are printed so as to be within a single layer.

6. The method according to claim 1, wherein the first thermoset silicon-containing polymer comprises at least one polymer selected from the group of a polysiloxane; a polyalkylsiloxane; a polydialkylsiloxane; and combinations, or co-polymers thereof.

7. The method according to claim 1, wherein the first thermoset silicon-containing polymer comprises at least one functional group selected from the group consisting of hydroxyl, alkyl, alkenyl, alkynyl, aryl, alkoxy, alkenoxy, alkynoxy, aryloxy, arylalkyl, arylalkoxy, arylalkenoxy, vinyl, carboxyl, carbonyl, halogen, heterocyclic, and fluorinated and perfluorinated groups thereof.

8. The method according to claim 1, wherein the first composition comprising the first thermoset silicon-containing polymer comprises one or components selected from the group consisting of a curative, a cure catalyst, an organic peroxide, a hydrolytic crosslinker, a siloxane additive, an ultra-high-molecular-weight siloxane additive, clarifiers, UV absorbers, optical brighteners, pigments, colorants, stabilizers, flame-retardants, quartz, pyrogenic silica, carbon black, fluorinated or perfluorinated polymer additives, and nanosilica dioxide particles.

9. The method according to claim 1, wherein the thermoplastic composition comprises at least one thermoplastic selected from the group consisting of polyolefins, polyoxymethylene, polyamides, polyesters, polyimides, polyarylene ethers, polyarylene ether ketones, polyarylene ether sulfones, polyphenylene oxide blended with polystyrene, polyacrylonitrile-butadiene-styrene, polystyrene-acrylonitrile, polyacrylonitrile, polystyrene, polyethylene terephthalate, polyethylene terephthalate glycol, thermoplastic elastomers and thermoplastic polyurethanes, and copolymers, blends, alloys, and derivatives thereof.

10. The method according to claim 1, wherein the reinforcing layer may comprise fibers.

11. The method according to claim 1, further comprising printing one or more additional at least partial layers of the first composition comprising the first thermoset silicon-containing polymer on the first at least partial layer thereof prior to printing the at least partial reinforcing layer.

12. The method according to claim 1, further comprising printing one or more additional at least partial reinforcing layers comprising the thermoplastic composition on the at least partial reinforcing layer.

13. The method according to claim 1, further comprising successively, and in an alternating manner, printing one or more additional at least partial layers of the first composition comprising the first thermoset silicon-containing polymer and one or more additional at least partial reinforcing layers comprising the thermoplastic composition on the at least one reinforcing layer.

14. The method according to claim 1, further comprising compression molding the article formed by the method into a modified article.

15. A three-dimensional article formed from the method of claim 1, having a composite structure comprising at least one at least partial layer of the first composition comprising the thermoset silicon-containing polymer and at least one partial layer of the reinforcing composition comprising the thermoplastic.

16. The method according to claim 1, further comprising
(e) providing a second composition comprising a second thermoset silicon-containing polymer; and
(f) printing an at least partial first layer of the second composition comprising the second thermoset silicon-containing polymer on the at least partial reinforcing layer using an additive manufacturing device.

17. The method according to claim 16, wherein the first at least partial layer of the second composition comprising the second thermoset silicon-containing polymer is a complete layer and the at least partial reinforcing layer is a complete layer.

18. The method according to claim 16, wherein the first at least partial layer of the second composition comprising the second thermoset silicon-containing polymer and the at least partial reinforcing layer are printed so as to be within a single layer.

19. The method according to claim 16, wherein the first thermoset silicon- containing polymer and/or the second thermoset silicon-containing polymer comprise at least one polymer selected from the group of a polysiloxane; a polyalkylsiloxane; a polydialkylsiloxane; and combinations, or co-polymers thereof.

20. The method according to claim 16, wherein the first thermoset silicon-containing polymer and/or the second thermoset silicon-containing polymer comprise at least one functional group selected from the group consisting of hydroxyl, alkyl, alkenyl, alkynyl, aryl, alkoxy, alkenoxy, alkynoxy, aryloxy, arylalkyl, arylalkoxy, arylalkenoxy, vinyl, carboxyl, carbonyl, halogen, heterocyclic, and fluorinated and perfluorinated groups thereof.

21. The method according to claim 16, wherein the first composition comprising the first thermoset silicon-containing polymer and/or the second composition comprising the second thermoset silicon-containing polymer comprises one or components selected from the group consisting of a curative, a cure catalyst, an organic peroxide, a hydrolytic crosslinker, a siloxane additive, an ultra-high-molecular-weight siloxane additive, clarifiers, UV absorbers, optical brighteners, pigments, colorants, stabilizers, flame-retardants, quartz, pyrogenic silica, carbon black, fluorinated or perfluorinated polymer additives, and nanosilica dioxide particles.

22. The method according to claim 16, wherein the first thermoset silicon-containing polymer and the second thermoset silicon-containing polymer are the same.

23. The method according to claim 16, wherein the first composition comprising the first thermoset silicon-containing polymer and the second composition comprising the second thermoset silicon-containing polymer are the same.

24. The method according to claim 16, wherein the thermoplastic composition comprises at least one thermoplastic selected from the group consisting of polyolefins, polyoxymethylene, polyamides, polyesters, polyimides, polyarylene ethers, polyarylene ether ketones, polyarylene ether sulfones, polyphenylene oxide blended with polystyrene, polyacrylonitrile-butadiene-styrene, polystyrene-acrylonitrile, polyacrylonitrile, polystyrene, polyethylene terephthalate, polyethylene terephthalate glycol, thermoplastic elastomers and thermoplastic polyurethanes, and copolymers, blends, alloys, and derivatives thereof.

25. The method according to claim 16, further comprising printing one or more successive at least partial layers of the first composition comprising the first thermoset silicon-containing polymer on the first at least partial layer thereof prior to printing the at least partial reinforcing layer.

26. The method according to claim 16, further comprising printing one or more successive at least partial reinforcing layers comprising the thermoplastic composition prior to printing the first at least partial layer of the second composition comprising the second thermoset silicon-containing polymer.

27. The method according to claim 16, further comprising printing one or more successive at least partial layers of the second composition comprising the second thermoset silicon-containing polymer on the first at least partial layer of the second composition comprising the second thermoset silicon-containing polymer.

28. The method according to claim 16, further comprising successively, and in an alternating manner, printing one or more additional at least partial layers of the first composition comprising the first thermoset silicon-containing polymer, one or more additional at least partial reinforcing layers comprising the thermoplastic composition, and one or more additional at least partial layers of the second composition comprising the second thermoset silicon-containing polymer according to a designed pattern on the first at least partial layer of the second composition comprising the second silicon containing polymer.

29. The method according to claim 28, wherein each of the at least partial layers of the first composition comprising the first thermoset silicon-containing polymer, each of the at least partial reinforcing layers comprising the thermoplastic composition, and each of the at least partial layers of the second composition comprising the second thermoset silicon-containing polymer is printed as a complete layer.

30. The method according to claim 16, further comprising compression molding the article formed by the method into a modified article.

31. The method according to claim 16, further comprising repeating steps (c), (d) and (f) to form an article based on a computer design model.

32. The method according to claim 16, wherein the article comprises a configuration that is a tubular or a cylindrical solid article.

33. A three-dimensional article formed from the method of claim 16, having a composite structure comprising at least one at least partial layer of the first composition comprising the thermoset silicon-containing polymer, at least one at least partial layer of the reinforcing composition comprising the thermoplastic and at least one at least partial layer of the second composition comprising a thermoset silicon-containing polymer.

34. The three-dimensional article according to claim 33, wherein the article is an O-ring, a seal, a gasket, a medical device, a medical implant, or a component part thereof.

35. The three-dimensional article according to claim 33, wherein the three-dimensional article is further subjected to compression molding to form a modified article.

* * * * *